(12) United States Patent
Wray et al.

(10) Patent No.: US 11,922,332 B2
(45) Date of Patent: *Mar. 5, 2024

(54) PREDICTIVE LEARNER SCORE

(71) Applicant: AstrumU, Inc., Kirkland, WA (US)

(72) Inventors: Adam Jason Wray, Medina, WA (US); Kaj Orla Peter Pedersen, Bellevue, WA (US); Xiao Cai, Kirkland, WA (US); Jue Gong, Lynnwood, WA (US)

(73) Assignee: AstrumU, Inc., Kirkland, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/385,054

(22) Filed: Jul. 26, 2021

(65) Prior Publication Data

US 2022/0138600 A1    May 5, 2022

Related U.S. Application Data

(63) Continuation of application No. 17/107,760, filed on Nov. 30, 2020, now Pat. No. 11,074,509.

(Continued)

(51) Int. Cl.
*G06N 20/00* (2019.01)
*G06F 40/40* (2020.01)
*G06N 5/04* (2023.01)

(52) U.S. Cl.
CPC .............. *G06N 5/04* (2013.01); *G06F 40/40* (2020.01); *G06N 20/00* (2019.01)

(58) Field of Classification Search
CPC ........... G06N 5/04; G06N 20/00; G06F 40/40
See application file for complete search history.

(56) References Cited

U.S. PATENT DOCUMENTS

| 6,067,535 A | 5/2000 | Hobson et al. |
| 6,199,062 B1 | 3/2001 | Byrne et al. |

(Continued)

FOREIGN PATENT DOCUMENTS

| WO | 03054727 A1 | 7/2003 |
| WO | 2020003325 A1 | 1/2020 |

OTHER PUBLICATIONS

Yanes, Nacim, Ayman Mohamed Mostafa, Mohamed Ezz, and Saleh Naif Almuayqil. "A machine learning-based recommender system for improving students learning experiences." IEEE Access 8 (2020): 201218-201235. (Year: 2020).*

(Continued)

*Primary Examiner* — Casey R. Garner
(74) *Attorney, Agent, or Firm* — John W. Branch; Branch Partners PLLC

(57) ABSTRACT

Embodiments are directed to managing data correlation over a network. Role success models that correspond to roles and to success criteria may be provided. A student profile that includes skill vectors may be provided based on student information. Role success models may be employed to determine intermediate scores based on the skill vectors and the success criteria. A predictive score for the student that corresponds with a predicted performance of the student in the roles may be generated based on the one or more intermediate scores. Actions for the student may be determined based on a mismatch of the skill vectors and role skill vectors that correspond to the roles. In response to the student performing the actions: updating the one or more skill vectors based on a completion of the actions; and updating the predictive score based on the role success models and the updated skill vectors.

20 Claims, 19 Drawing Sheets

Related U.S. Application Data

(60) Provisional application No. 63/108,253, filed on Oct. 30, 2020.

(56) References Cited

U.S. PATENT DOCUMENTS

| | | |
|---|---|---|
| 8,090,725 B1 | 1/2012 | Cranfill |
| 8,103,679 B1 | 1/2012 | Cranfill et al. |
| 8,375,026 B1 | 2/2013 | Elliott et al. |
| 8,688,694 B2 | 4/2014 | Dexter |
| 8,943,062 B2 | 1/2015 | Baumgartner et al. |
| 9,529,863 B1 | 12/2016 | Gindin et al. |
| 9,535,963 B1 | 1/2017 | Shankar et al. |
| 9,849,388 B2 | 12/2017 | Cohen et al. |
| 10,230,701 B2 | 3/2019 | Ullrich et al. |
| 10,610,792 B2 | 4/2020 | Adekunle et al. |
| 10,789,755 B2 | 9/2020 | Amer et al. |
| 11,074,476 B2 | 7/2021 | Wray et al. |
| 11,074,509 B1 | 7/2021 | Wray et al. |
| 11,151,673 B1 | 10/2021 | Wray et al. |
| 11,227,240 B2 | 1/2022 | Cohen et al. |
| 11,250,721 B2 | 2/2022 | Angel et al. |
| 11,429,893 B1 | 8/2022 | Tong |
| 11,494,863 B2 | 11/2022 | Wray et al. |
| 11,580,323 B2 | 2/2023 | Wray et al. |
| 2002/0055870 A1 | 5/2002 | Thomas |
| 2002/0059228 A1 | 5/2002 | McCall et al. |
| 2004/0236598 A1 | 11/2004 | Thomsen |
| 2005/0080656 A1 | 4/2005 | Crow et al. |
| 2005/0239032 A1 | 10/2005 | Hartenberger |
| 2006/0229896 A1 | 10/2006 | Rosen et al. |
| 2006/0265436 A1 | 11/2006 | Edmond et al. |
| 2006/0271421 A1 | 11/2006 | Steneker et al. |
| 2007/0082324 A1 | 4/2007 | Johnson et al. |
| 2007/0106811 A1 | 5/2007 | Ryman |
| 2008/0155588 A1 | 6/2008 | Roberts et al. |
| 2008/0254423 A1 | 10/2008 | Cohen |
| 2010/0057659 A1* | 3/2010 | Phelon ............. G06Q 10/06311 706/46 |
| 2010/0125475 A1* | 5/2010 | Twyman ................ G06Q 10/00 705/7.42 |
| 2010/0145729 A1 | 6/2010 | Katz |
| 2011/0177483 A1* | 7/2011 | Needham ................ G09B 7/00 434/322 |
| 2011/0238591 A1 | 9/2011 | Kerr et al. |
| 2012/0022906 A1 | 1/2012 | Snyder et al. |
| 2012/0208166 A1 | 8/2012 | Ernst et al. |
| 2013/0275446 A1 | 10/2013 | Jain et al. |
| 2013/0281798 A1 | 10/2013 | Rau et al. |
| 2013/0291098 A1 | 10/2013 | Chung et al. |
| 2014/0025427 A1 | 1/2014 | Bastian et al. |
| 2014/0089219 A1 | 3/2014 | Mathews |
| 2014/0172732 A1 | 6/2014 | Baladi |
| 2014/0272889 A1 | 9/2014 | Kulkarni et al. |
| 2014/0279632 A1 | 9/2014 | Andersen et al. |
| 2015/0088793 A1* | 3/2015 | Burgess ................. G06N 20/00 706/12 |
| 2015/0140526 A1 | 5/2015 | Marino et al. |
| 2015/0242979 A1 | 8/2015 | Abts |
| 2015/0310393 A1 | 10/2015 | Bhaskaran et al. |
| 2015/0317754 A1 | 11/2015 | Goel et al. |
| 2015/0347917 A1 | 12/2015 | Hua et al. |
| 2015/0379454 A1 | 12/2015 | Polli et al. |
| 2016/0217701 A1 | 7/2016 | Brown et al. |
| 2016/0293036 A1 | 10/2016 | Niemi et al. |
| 2016/0352760 A1 | 12/2016 | Mrkos et al. |
| 2016/0379170 A1* | 12/2016 | Pande ................... G06F 16/285 705/321 |
| 2017/0024701 A1 | 1/2017 | Tang et al. |
| 2017/0076244 A1 | 3/2017 | Bastide et al. |
| 2017/0109448 A1* | 4/2017 | Adamy ............... G06F 16/9535 |
| 2017/0213179 A1 | 7/2017 | Schissel et al. |
| 2017/0213190 A1 | 7/2017 | Hazan |
| 2017/0243163 A1 | 8/2017 | Vootkur |
| 2017/0293841 A1 | 10/2017 | McAllister et al. |
| 2017/0323211 A1 | 11/2017 | Bencke et al. |
| 2017/0323233 A1 | 11/2017 | Bencke et al. |
| 2018/0039946 A1 | 2/2018 | Bolte et al. |
| 2018/0046623 A1 | 2/2018 | Faith et al. |
| 2018/0144253 A1 | 5/2018 | Merhav et al. |
| 2018/0157995 A1* | 6/2018 | O'Malley ............. G06Q 30/00 |
| 2018/0225593 A1 | 8/2018 | Cozine et al. |
| 2018/0247549 A1 | 8/2018 | Martin et al. |
| 2018/0293327 A1 | 10/2018 | Miller et al. |
| 2018/0300755 A1 | 10/2018 | Rohilla et al. |
| 2019/0102700 A1 | 4/2019 | Babu et al. |
| 2019/0108217 A1 | 4/2019 | Chen |
| 2019/0122161 A1* | 4/2019 | Cicio, Jr. ................ G06F 16/22 |
| 2019/0151758 A1 | 5/2019 | Anglin et al. |
| 2019/0180098 A1 | 6/2019 | Carpenter et al. |
| 2019/0251477 A1 | 8/2019 | Crosta et al. |
| 2019/0279159 A1 | 9/2019 | Cleaver et al. |
| 2019/0378050 A1 | 12/2019 | Edkin et al. |
| 2020/0211041 A1 | 7/2020 | Raudies et al. |
| 2020/0302296 A1 | 9/2020 | Miller |
| 2020/0394592 A1 | 12/2020 | Shi et al. |
| 2021/0158074 A1 | 5/2021 | Wray et al. |
| 2021/0256310 A1 | 8/2021 | Roberts et al. |
| 2021/0279668 A1 | 9/2021 | Mikhajlov |
| 2021/0334921 A1 | 10/2021 | Austin et al. |
| 2021/0350167 A1 | 11/2021 | Wray et al. |
| 2022/0028020 A1 | 1/2022 | Wray et al. |
| 2022/0156866 A1 | 5/2022 | Dua et al. |
| 2022/0245487 A1 | 8/2022 | Shen et al. |
| 2022/0375015 A1 | 11/2022 | Botteril et al. |
| 2022/0391725 A1 | 12/2022 | Wray et al. |
| 2023/0039710 A1 | 2/2023 | Moore et al. |
| 2023/0245030 A1 | 8/2023 | Cai et al. |
| 2023/0350952 A1 | 11/2023 | Pedersen et al. |

OTHER PUBLICATIONS

Alshanqiti, Abdullah, and Abdallah Namoun. "Predicting student performance and its influential factors using hybrid regression and multi-label classification." IEEE Access 8 (2020): 203827-203844. (Year: 2020).*

Gonzalez, Avelino J., and Lorie Ramos Ingraham. "Automated exercise progression in simulation-based training." IEEE transactions on systems, man, and cybernetics 24, No. 6 (1994): 863-874. (Year: 1994).*

Office Communication for U.S. Appl. No. 16/691,479 dated Mar. 2, 2020, pp. 1-22.

Office Communication for U.S. Appl. No. 16/691,479 dated Jun. 25, 2020, pp. 1-26.

Office Communication for U.S. Appl. No. 16/898,177 dated Jul. 22, 2020, pp. 1-12.

Office Communication for U.S. Appl. No. 16/691,479 dated Sep. 11, 2020, pp. 1-6.

Office Communication for U.S. Appl. No. 16/898,177 dated Nov. 2, 2020, pp. 1-13.

Patel, Kayur et al., "Using Multiple Models to Understand Data," In Proceedings of the Twenty-Second international joint conference on Artificial Intelligence—vol. Two (IJCAI'11), AAAI Press, 1723-1728.

Office Communication for U.S. Appl. No. 16/898,177 dated Feb. 2, 2021, pp. 1-5.

Ludwigsen, Scott, "What Is Localization, And When Do You Need It?" Feb. 21, 2018 retrieved at: https://blog.languageline.com/what-is-localization, pp. 1-5.

Office Communication for U.S. Appl. No. 17/107,760 dated Feb. 8, 2021, pp. 1-35.

Office Communication for U.S. Appl. No. 16/691,479 dated Feb. 19, 2021, pp. 1-26.

Office Communication for U.S. Appl. No. 16/898,177 dated Feb. 23, 2021, pp. 1-9.

Office Communication for U.S. Appl. No. 17/107,760 dated May 20, 2021, pp. 1-8.

Office Communication for U.S. Appl. No. 16/691,479 dated Jun. 10, 2021, pp. 1-36.

(56) References Cited

OTHER PUBLICATIONS

Dillenberger, Donna N. et al., "Blockchain Analytics and Artificial Intelligence," IBM Journal of Research and Development, 2019, pp. 1-13.
Office Communication for U.S. Appl. No. 16/898,177 dated Jun. 18, 2021, pp. 1-11.
Office Communication for U.S. Appl. No. 16/898,177 dated Sep. 1, 2021, pp. 1-16.
Office Communication for U.S. Appl. No. 17/384,577 dated Nov. 26, 2021, pp. 1-31.
Office Communication for U.S. Appl. No. 17/492,527 dated Jan. 18, 2022, pp. 1-11.
"More Than 80 New Products Will be Showcased at Next Week's HR Technology Conference & Exposition®," NoticiasFinancieras, Miami, Oct. 2017, pp. 1-7.
Office Communication for U.S. Appl. No. 17/384,577 dated Jul. 11, 2022, pp. 1-31.
Office Communication for U.S. Appl. No. 17/492,527 dated Jul. 15, 2022, pp. 1-9.
Office Communication for U.S. Appl. No. 17/732,768 dated Jul. 21, 2022, pp. 1-44.
Office Communication for U.S. Appl. No. 17/587,413 dated Aug. 9, 2022, pp. 1-31.
Office Communication for U.S. Appl. No. 17/384,577 dated Mar. 22, 2022, pp. 1-32.
Office Communication for U.S. Appl. No. 17/587,413 dated Apr. 7, 2022, pp. 1-27.
Office Communication for U.S. Appl. No. 17/492,527 dated Apr. 29, 2022, pp. 1-12.
Office Communication for U.S. Appl. No. 17/384,577 dated Jun. 13, 2022, pp. 1-5.
Office Communication for U.S. Appl. No. 17/587,413 dated Nov. 1, 2022, pp. 1-5.
Office Communication for U.S. Appl. No. 17/888,920 dated Nov. 16, 2022, pp. 1-22.
Office Communication for U.S. Appl. No. 17/587,413 dated Nov. 22, 2022, pp. 1-24.
Office Communication for U.S. Appl. No. 17/384,577 dated Nov. 25, 2022, pp. 1-29.
Office Communication for U.S. Appl. No. 17/732,768 dated Nov. 30, 2022, pp. 1-48.
Office Communication for U.S. Appl. No. 17/732,768 dated Feb. 13, 2023, pp. 1-4.
Office Communication for U.S. Appl. No. 17/888,920 dated Mar. 10, 2023, pp. 1-24.
Office Communication for U.S. Appl. No. 17/587,413 dated Mar. 20, 2023, pp. 1-25.
Office Communication for U.S. Appl. No. 17/732,768 dated Mar. 22, 2023, pp. 1-52.
Office Communication for U.S. Appl. No. 18/091,698 dated Apr. 20, 2023, pp. 1-47.
Office Communication for U.S. Appl. No. 17/888,920 dated May 16, 2023, pp. 1-4.
Office Communication for U.S. Appl. No. 17/587,413 dated May 18, 2023, pp. 1-5.
Office Communication for U.S. Appl. No. 17/587,413 dated Jul. 14, 2023, pp. 1-28.
Office Communication for U.S. Appl. No. 17/732,768 dated Jul. 14, 2023, pp. 1-52.
Office Communication for U.S. Appl. No. 17/732,768 dated Oct. 13, 2023, 9 Pages.
Office Communication for U.S. Appl. No. 17/888,920 dated Sep. 14, 2023, 24 Pages.
Office Communication for U.S. Appl. No. 18/091,698 dated Aug. 31, 2023, 53 Pages.
Office Communication for U.S. Appl. No. 18/216,025 dated Sep. 6, 2023, 14 Pages.

* cited by examiner

PREDICTIVE LEARNER SCORE

CROSS-REFERENCE TO RELATED APPLICATION

This Utility Patent Application is a Continuation of U.S. patent application Ser. No. 17/107,760 filed on Nov. 30, 2020, now U.S. Pat. No. 11,074,509 issued on Jul. 27, 2021, which is based on previously filed U.S. Provisional Patent Application No. 63/108,253 filed on Oct. 30, 2020, the benefit of the filing date of which is hereby claimed under 35 U.S.C. § 119(e) and § 120 and the contents of which are each further incorporated in entirety by reference.

TECHNICAL FIELD

The present invention relates generally to data management, and more particularly, but not exclusively, to employing data to quantify the efficacy of actions taken to reach goals.

BACKGROUND

Identifying persons that make good employees has long been a goal of organizations. And, in today's highly competitive global market, finding and keeping great employees is becoming more challenging. Conventionally, organizations may be forced to rely on narrow or limited criteria derived from anecdotal evidence, personal preferences, gut feelings, or the like, rather than evidence based analytics to determine if a person may be a good employee candidate. Similarly, educational institutions may want to provide educational opportunities that provide their students desirable employment opportunities. Accordingly, in some cases, educational institutions may design offerings based on their perception of the needs of desirable employers. But, not unlike employers, educational institutions may have limited access to evidence based analytics to help them design their offerings. Further, students may seek out educational institutions that to prepare them for careers with desirable employers. However, similar to employers and educational institutions, students (or potential students) have limited access to evidence based analytics to help them select educational institutions or employers. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
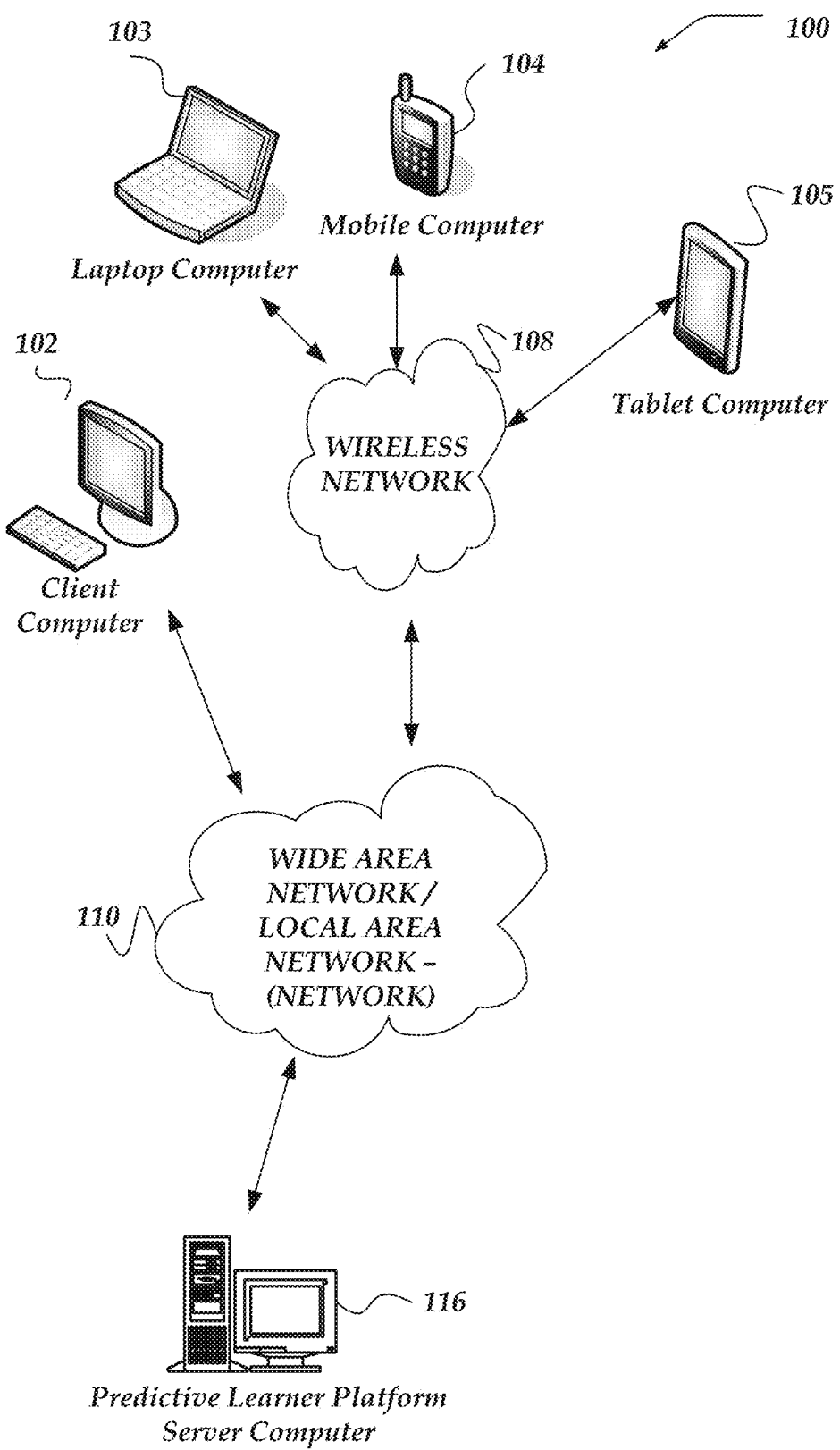
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the term "data source" refers to a service, system, or facility that may provide data to a data ingestion platform. Data sources may be local (e.g., on premises databases, reachable via a local area network, or the like) or remote (e.g., reachable over a wide-area network, remote endpoints, or the like). In some cases, data sources may be streams that provide continuous or intermittent flows of data to a data ingestion platform. Further, in some cases, data sources may be local or remote file systems, document management systems, cloud-based storage, or the like. Data sources may support one or more conventional or customer communication or data transfer protocols, such as, TCP/IP, HTTP, FTP, SFTP, SCP, RTP, or the like. In some cases, data sources may be owned, managed, or operated by various organizations that may provide data to a data ingestion platform. In some instances data sources may be public or private websites or other public or private repositories that enable third parties to access hosted content.

As used herein the term "raw data source" refers to a data source that generally provides its data as is, or otherwise with little coordination with a data ingestion platform. In most cases, raw data sources provide data that may require additional parsing or processing before it is usable by a data ingestion platform.

As used herein the term "integrated data source" refers to a data source that enables closer coordination with a data ingestion platform. In some cases, the data provided by an integrated data source may be formatted or otherwise configured to facilitate its use by a data ingestion platform.

As used herein the term "raw data" refers to data provided by a raw data source. Raw data may include structured or unstructured data, documents, streams, or the like. Provided data may be considered as raw because the data source may provide the data in a form or format "as-is."

As used herein the term "integrated data" refers to data provided by an integrated data source. Similar to raw data, integrated data may include structured or unstructured data, documents, streams, or the like. However, the provided data may be considered integrated data rather than raw because the data source may be arranged or configured to provide the data in a form or format that is consistent with one or more requirements of a data ingestion platform. Also, in some cases, integrated data may include information presumed to represent truths, such as, government or standard based codes, demographic information, or the like.

As used herein the term "categorization model" refers one or more data structures that encapsulate the data, rules, machine learning models, machine learning classifiers, or instructions that may be employed to associate raw data with a raw data category. Categorization models may include various components, such as, one or more machine learning based classifiers, heuristics, rules, pattern matching, conditions, or the like, that may be employed to assign data to a category. In some cases, categorization models may provide confidence scores that represent the quality of the categorizations. In some cases, categorization engines may employ one or more categorization models to categorize incoming raw data assets. For example, category models may be employed to determine if a document is a student transcript, resume, job listing, job description, course description, course catalog, or the like.

As used herein the term "translation model" refers one or more data structures that encapsulate the data, rules, machine learning models, machine learning classifiers, or instructions that may be employed to match or map information included in raw data assets to a unified schema. Translation models may include various components, such as, one or more machine learning based classifiers, heuristics, rules, pattern matching, conditions, or the like, that may be employed to match or map information in raw data assets to a unified schema. In some cases, translation models may provide confidence scores that represent the quality of the matches. Different translation models may be provided for different categories of raw data assets. For example, one translation model may be directed to translating information included in course descriptions while another translation model may be directed to translating information included in resumes. Likewise, in some cases, one translation model may be arranged to match information for more than one category of raw data. Also, in some cases, more than one translation model may be arranged to match the same category of data.

As used herein the term "recommendation model" refers one or more data structures that encapsulate the data, rules, machine learning models, machine learning classifiers, or instructions that may be employed to match or correlate profiles, including matching student profiles with position profiles. Recommendation models may include various components, such as, one or more machine learning based classifiers, heuristics, rules, pattern matching, conditions, or the like, that may be employed to match student profile with position profiles. In some cases, recommendation models may provide confidence scores that represent the quality of the matches. Different recommendation models may be provided for different categories of profile or match queries.

As used herein the term "profile model" refers one or more data structures that encapsulate the data, rules, or instructions that may be employed to generate profiles based on the ingested data. For example, a profile model may include rules or instructions for generating a student profile from ingested data.

As used herein the term "unified schema" refers a data schema that may be used to define the entities, fields, or attributes of a common data store. Information included in raw data may be matched to entities, fields, or attributes defined by a unified schema.

As used herein the term "unified fact" refers to one or more data structures or records that include values that conform to a unified schema. Information included in raw data may be mapped to unified facts that conform to a unified schema.

As used herein the term "subject" refers to an entity, such as, a user, student, employee, organization, person, or the like. Various information included in some raw data may be associated with one or more subjects.

As used herein the term "subject fact" refers to one or more data structures, values, or records that represent unified facts that are owned or associated with a subject. Subject facts may often be information that may be considered personally identifiable information. For example, ingested information that is associated with an individual student, such as, name, address, course of study, transcripts, grades, or the like, may be considered subject facts.

As used herein the term "non-subject fact" refers to one or more data structures, values, or records that represent unified facts that are not considered sensitive or otherwise directly associated with a subject. In some cases, non-subject facts may be derived or computed from subject facts. For example, federal job codes may be considered non-subject facts. Also, for example, aggregate data, such as, average student body grade point average, course of study distribution information, or the like, may be considered non-subject data.

As used herein the term "profile" refers to one or more data structures or records gathered together to provide information about a subject. For example, a student profile may include various subject facts or non-subject facts that are relevant to a particular student.

As used herein the term "selection score" refers to a score that may be employed to select a unified fact value from among different results produced by different translation models and the same raw data. In some cases, selection scores may be generated based on the confidence score of a given result and a reputation score of the translation model that produced the results.

As used herein the term "configuration information" refers to information that may include rule based policies, pattern matching, scripts (e.g., computer readable instructions), or the like, that may be provided from various sources, including, configuration files, databases, user input, built-in defaults, plug-ins, extensions, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing data correlation over a network. In one or more of the various embodiments, one or more role success models that correspond to one or more roles and to one or more success criteria may be provided such that the one or more success criteria may be correlated with one or more historically successful performance in the one or more roles. In one or more of the various embodiments, the one or more success criteria may include one or more of promotions, time in role career path, time in role industry, tenure in current position, travel history, or the like.

In one or more of the various embodiments, a student profile that includes one or more skill vectors may be provided such that one or more elements of the one or more skill vectors may correspond to one or more skills of a student that are based on student information.

In one or more of the various embodiments, the one or more role success models may be employed to determine one or more intermediate scores based on the one or more skill vectors and the one or more success criteria such that one or more values of the one or more intermediate scores corresponds to a strength of a match of the student profile with the one or more success criteria.

In one or more of the various embodiments, a predictive score for the student that corresponds with a predicted performance of the student in the one or more roles based on the one or more intermediate scores nay be generated.

In one or more of the various embodiments, one or more actions for the student may be determined based on a mismatch of the one or more skill vectors and one or more role skill vectors that correspond to the one or more roles.

In one or more of the various embodiments, determining the one or more actions for the student may include: determining one or more role skills included in the one or more role skill vectors that are absent from the one or more skill vectors; determining the one or more actions based on one or more courses, one or more trainings, or one or more employment activities that provide the one or more role skills that are absent from the one or more skill vectors; providing a report to the student that includes the one or more actions; or the like.

In one or more of the various embodiments, in response to the student performing the one or more actions, further actions may be employed, including: updating the one or more skill vectors based on a completion of the one or more actions; and updating the predictive score based on the one or more role success models and the one or more updated skill vectors.

In one or more of the various embodiments, one or more descriptions of the one or more roles may be provided such that the one or more descriptions are comprised of natural language text that describe one or more required skills for the one or more roles. In some embodiments, one or more skill models may be employed to determine one or more role skills for the one or more roles such that the one or more skill models may determine the one or more role skills from the natural language text included in the one or more descriptions. In one or more of the various embodiments, the one or more role skill vectors may be generated based on the one or more role skills. In one or more of the various embodiments, the one or more role profiles that include the one or more role skill vectors may be generated. And, in one or more of the various embodiments, the one or more actions for the student may be determined based on the one or more role profiles.

In one or more of the various embodiments, alumni information for a plurality of alumni may be provided such that the alumni information includes one or more of educational information or employment information. In some embodiments, one or more skill models may be employed to determine one or more alumni skills for the plurality of alumni based on the alumni information such that the one or more skill models may determine the one or more alumni skills from the natural language text included in the alumni information. In some embodiments, one or more alumni skill vectors may be generated based on the one or more alumni skills. In some embodiments, one or more alumni profiles that include the one or more alumni skill vectors may be generated. And, in some embodiments, the one or more role success models may be trained based on the one or more alumni profiles and the one or more success criteria such that the one or more role success models may be trained to identify one or more alumni that match the one or more success criteria.

In one or more of the various embodiments, student information for one or more students may be provided such that the student information includes natural language text that describes one or more of student educational history, course syllabuses of courses taken by each student, student employment history, or the like. In some embodiments, one or more skill models may be employed to determine the one or more skills for the one or more students such that the one or more skill models determine the one or more skills from the natural language text included in the student information. In some embodiments, the one or more skill vectors may be generated based on the one or more skills. And, in some embodiments, the one or more student profiles that include the one or more skill vectors may be generated.

In one or more of the various embodiments, a hierarchy of two or more associated skills may be determined from a single skill topic included in the student information such that a skill that may be higher in the hierarchy may be a broader skill that may include each skill in the hierarchy that may be lower in the hierarchy. And, in some embodiments, each skill in the hierarchy may be included as separate elements in the one or more skill vectors.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, predictive learner platform server computer 116, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CS S), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, predictive learner platform server computer 116, or other computers.

Client computers 102-105 may further be configured to include a client application that enables an end-user to log into an end-user account that may be managed by another computer, such as ingestion platform server computer 116, profile correlation server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by predictive learner platform server computer 116, or the like.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, predictive learner platform server computer 116, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of predictive learner platform server computer 116 are described in more detail below in conjunction with FIG. 3. Although FIG. 1 illustrates predictive learner platform server computer 116 as a single computer, the innovations or embodiments are not so limited. For example, one or more functions of predictive learner platform server computer 116 may be distributed across one or more distinct network computers. Moreover, in one or more embodiments, predictive learner platform server computer 116 may be implemented using a plurality of network computers. Further, in one or more of the various embodiments, predictive learner platform server computer 116, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
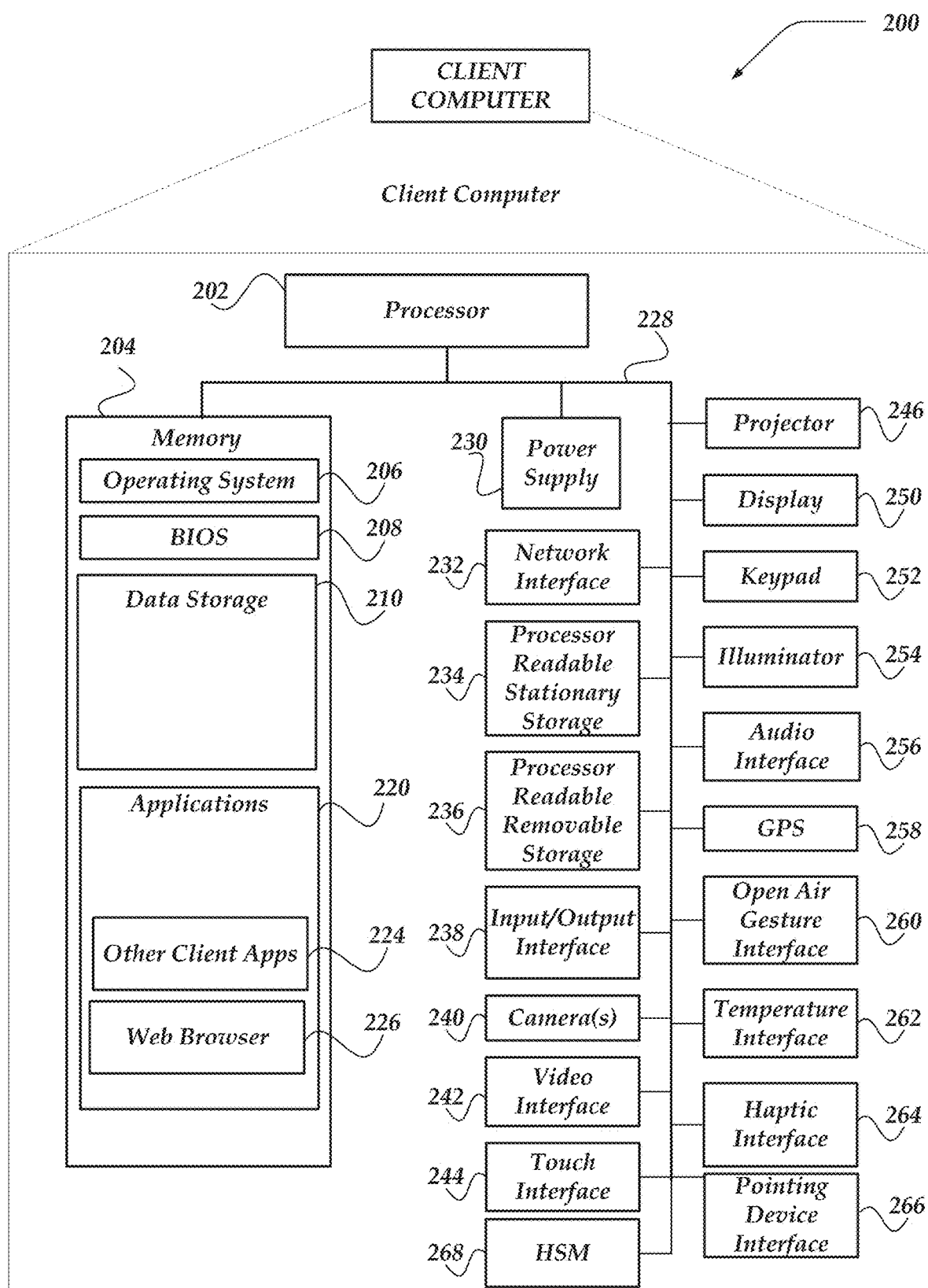
FIG. 2 illustrates a schematic embodiment of a client computer.

FIG. 2 shows one embodiment of client computer 200 that may include many more or less components than those shown. Client computer 200 may represent, for example, one or more embodiments of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over networks implemented using WiFi, Bluetooth™, Bluetooth LTE™, and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, client user interface engine 222, other client applications 224, web browser 226, or the like. Client computers may be arranged to exchange communications one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, visualization applications, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
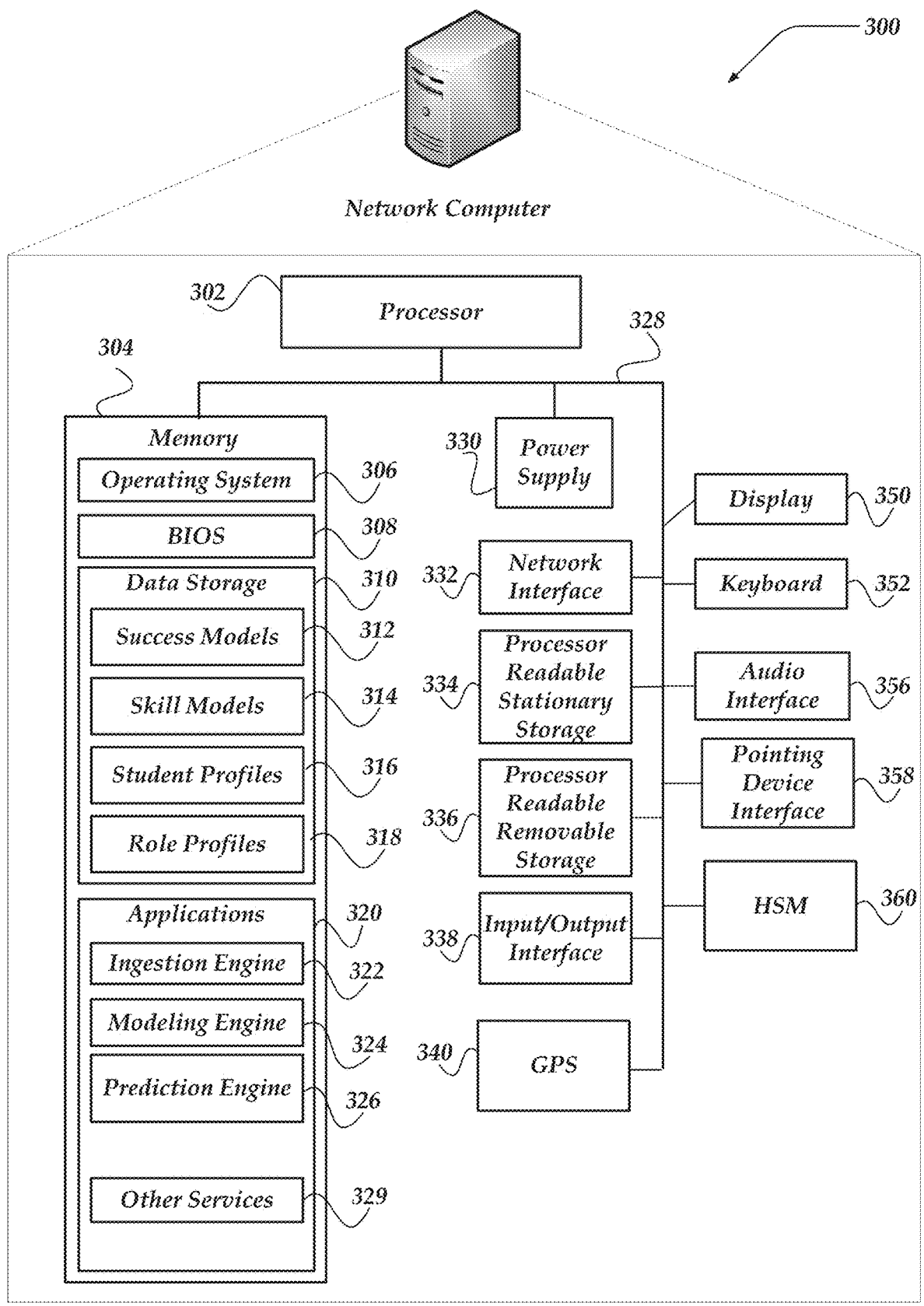
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one or more embodiments of a file system management server computer such as ingestion platform server computer 116, profile correlation server computer 118, or the like, of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geopositioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, ingestion engine 322, modeling engine 324, recommendation engine 328, other services 329, or the like, may be arranged to employ geolocation information to select one or more localization features, such as, time zones, languages, currencies, currency formatting, calendar formatting, or the like. Localization features may be used in user interfaces, dashboards, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or Linux®, or a specialized operating system such as Microsoft Corporation's Windows® operating system, or the Apple Corporation's macOS® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, friend lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, success models 312, skill models 314, student profiles 316, role profiles 318, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include ingestion engine 322, modeling engine 324, recommendation engine 328, other services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, ingestion engine 322, modeling engine 324, recommendation engine 328, other services 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to ingestion engine 322, modeling engine 324, recommendation engine 328, other services 329, or the like, may be provisioned and de-commissioned automatically.

Also, in one or more of the various embodiments, ingestion engine 322, modeling engine 324, recommendation engine 328, other services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
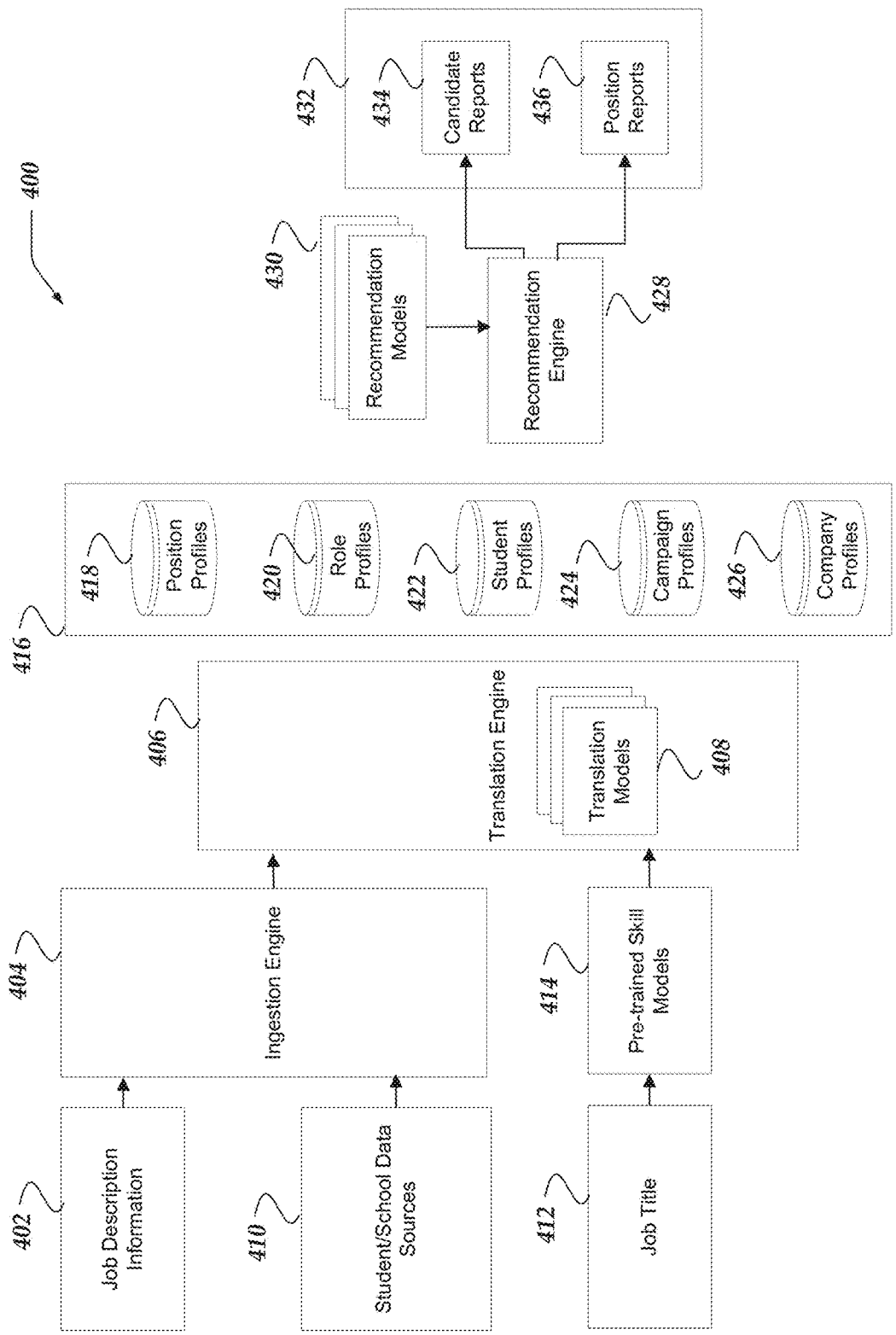
FIG. 4 illustrates a logical architecture of system 400 for predictive learner scores in accordance with one or more of the various embodiments.

FIG. 4 illustrates a logical architecture of system 400 for predictive learner scores in accordance with one or more of the various embodiments. In one or more of the various embodiments, system 400 shows a portion of the sub-systems that may comprise a system for correlating education programs and employment objectives. One of ordinary skill in the art will appreciate that in some embodiments, one or more of the sub-systems shown here may be combined into larger sub-systems. Likewise, in some embodiments, one or more of the sub-systems may be included smaller sub-systems. In some embodiments, one or more of the sub-systems comprising system 400 may be executed by one or more processes, services, or engines, such as, ingestion engine 322, modeling engine 324, prediction engine 326, or the like.

Accordingly, in some embodiments, job description information, such as, job description information 402 may be provided by one or more ingestion engines, such as, ingestion engine 404, or the like. Likewise, in some embodiments, student information may be provided by various student/school data sources, such as student/school data sources 410.

Further, in some embodiments, one or more sources of job titles, such as, job titles 412 may be provided to one or more pre-trained skill models, such as, pre-trained skill models 414. In one or more of the various embodiments, the pre-trained skill models may be arranged to determine one or more skills, traits, experience, or the like, that may be correlated with a job title or career type. Accordingly, in some embodiments, identified skills may be provided to translation engine 406.

In some embodiments, after ingestion, job description information 402 may be arranged to provided to translation engine 406. In some embodiments, job description information may be provided directly by employers. Also, in some embodiments, job description information may be provided by collecting publicly available information, as described above.

Similarly, in one or more of the various embodiments, student/school data sources may provide various personal or institutional data to ingestion engine 404. Accordingly, in some embodiments, ingestion engine 404 may provide the collected information to translation engine 406.

Accordingly, in one or more of the various embodiments, translation engine 406 may be arranged to employ translation models, such as, translation models 408 along with one or more portions of the information provided by the various data source to generate various position profiles, such as, (job) position profiles 418, role profiles 420, student profiles 422, campaign profiles 424, company profiles 426, or the like.

In some embodiments, profiles generated by translation engines may be stored in one or more data stores. In some embodiments, data stores employed for storing profiles or profile information may be databases, key value stores, or the like, that enable profiles to be retrieved, updated, deleted, or the like.

In one or more of the various embodiments, recommendation engines, such as, recommendation engine 428 may be arranged to employ one or more recommendation models, such as, recommendation models 430 to correlate various profiles, such as, position profiles with student profiles. Accordingly, in one or more of the various embodiments, one or more correlation reports, such as, correlation reports 432 may be provided. In some embodiments, one or more correlation reports, such as, candidate report 434 may be arranged to at least include a list of one or more students that may be determined by the recommendation engine to be good candidates for a given employment position. Similarly, in some embodiments, one or more correlation reports, such as, position reports 436 may be arranged to include a list one or more employment positions that may be determined by the recommendation engine to good opportunities for a given student.

Figure 5:
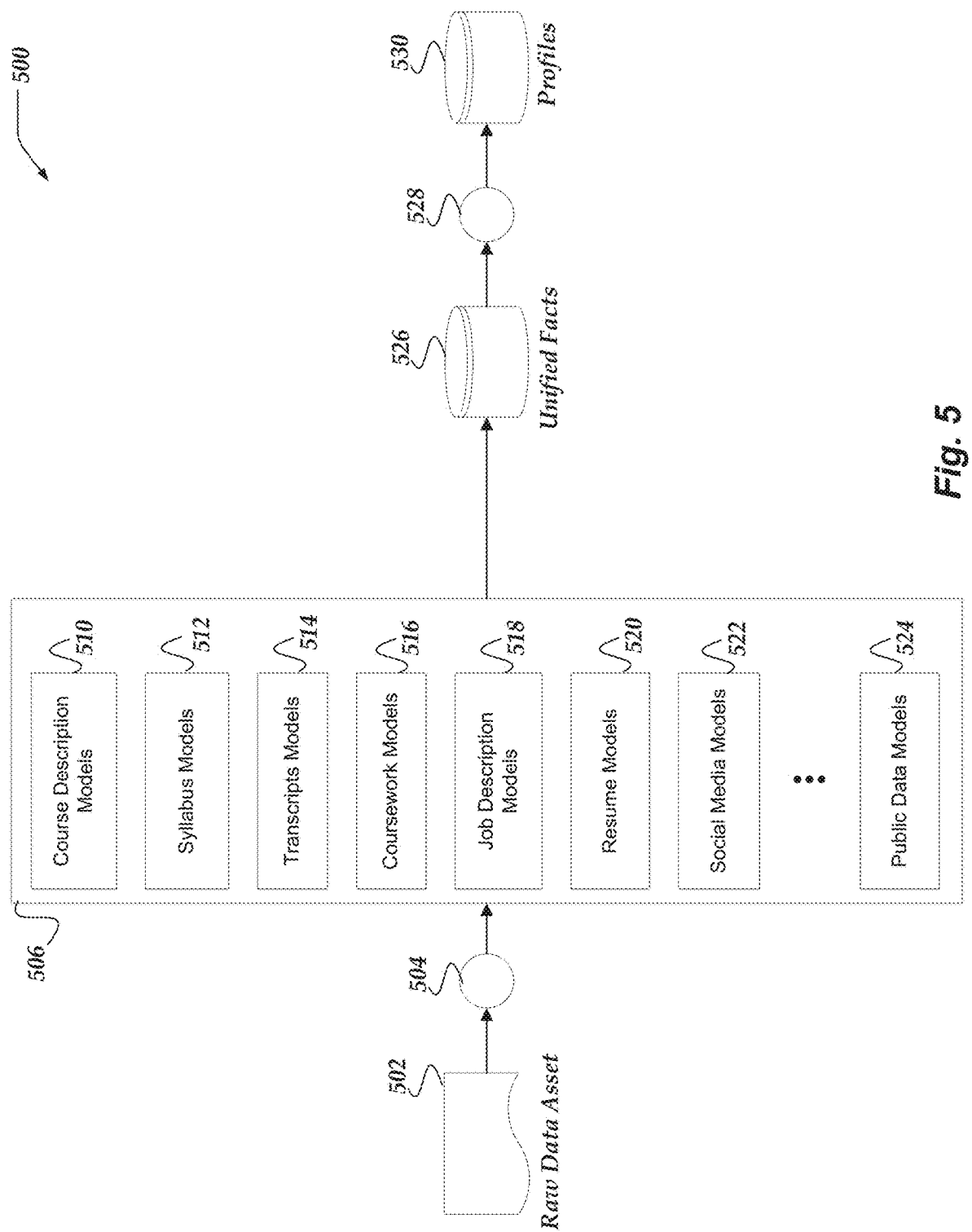
FIG. 5 illustrates a logical schematic of a system for a predictive learner score platform in accordance with one or more of the various embodiments.

FIG. 5 illustrates a logical schematic of system 500 for a predictive learner platform in accordance with one or more of the various embodiments. In some embodiments, system 500 may be arranged to receive a raw data asset, such as, raw data asset 502. In some embodiments, raw data asset 502 may be categorized or otherwise pre-processed via one or more components, represented by component 504. For example, in some embodiments, component 504 may be a categorization engine, or the like.

In one or more of the various embodiments, raw data asset 502 may be provided to a translation engine, such as, translation engine 506. Accordingly, in one or more of the various embodiments, translation engine 506 may be arranged to employ one or more translation models that may be arranged to match some or all of information included in raw data asset 502 to one or more unified facts.

In one or more of the various embodiments, processes performed by components 504 may include categorizing raw data asset 502 and then based on the result of the categorization, one or more translation models arranged for interpreting the category of data that has been associated with raw data asset 502.

In one or more of the various embodiments, translation models may be arranged to process data assets associated with one or more categories that may represent a specific topics or information classes. In this example, raw data asset 502 may be associated with students, schools, employers, or the like. Thus, in this example, translation models may be targeted to different types of raw data assets. Accordingly, in one or more of the various embodiments, translation models may include course description models 510, syllabus models 512, student transcript models 514, coursework models 516, job description models 518, resume models 520, social media models 522, public data models 524, or the like.

Accordingly, in one or more of the various embodiments, translation engine 506 may execute one or more translation operations based on heuristics, machine learning classifiers, machine learning models, rules, instructions, or the like, defined or referenced by the one or more translation models. In some embodiments, translation operations may include identifying information included in the raw data that can be matched to a unified schema to provide unified facts.

In one or more of the various embodiments, unified facts generated by the translation engine may be stored in a unified fact data store, such as, data store 526.

In one or more of the various embodiments, the unified facts may be employed to generate various profiles, such as, student profiles, employer profiles, school profiles, or the like, that may be used for providing reports (interactive or otherwise) to users of a data ingestion system.

In one or more of the various embodiments, profiles may be comprised of one or more unified facts that may include one or more subject facts or one or more non-subject facts. In some embodiments, a profile engine may be arranged to employ profile models to determine the contents of a profile. In some embodiments, profiles may be arranged to encapsulate the rules, heuristics, machine-learning classifiers, or the like, that may be employed to generate profiles based on one or more unified facts.

Figure 6:
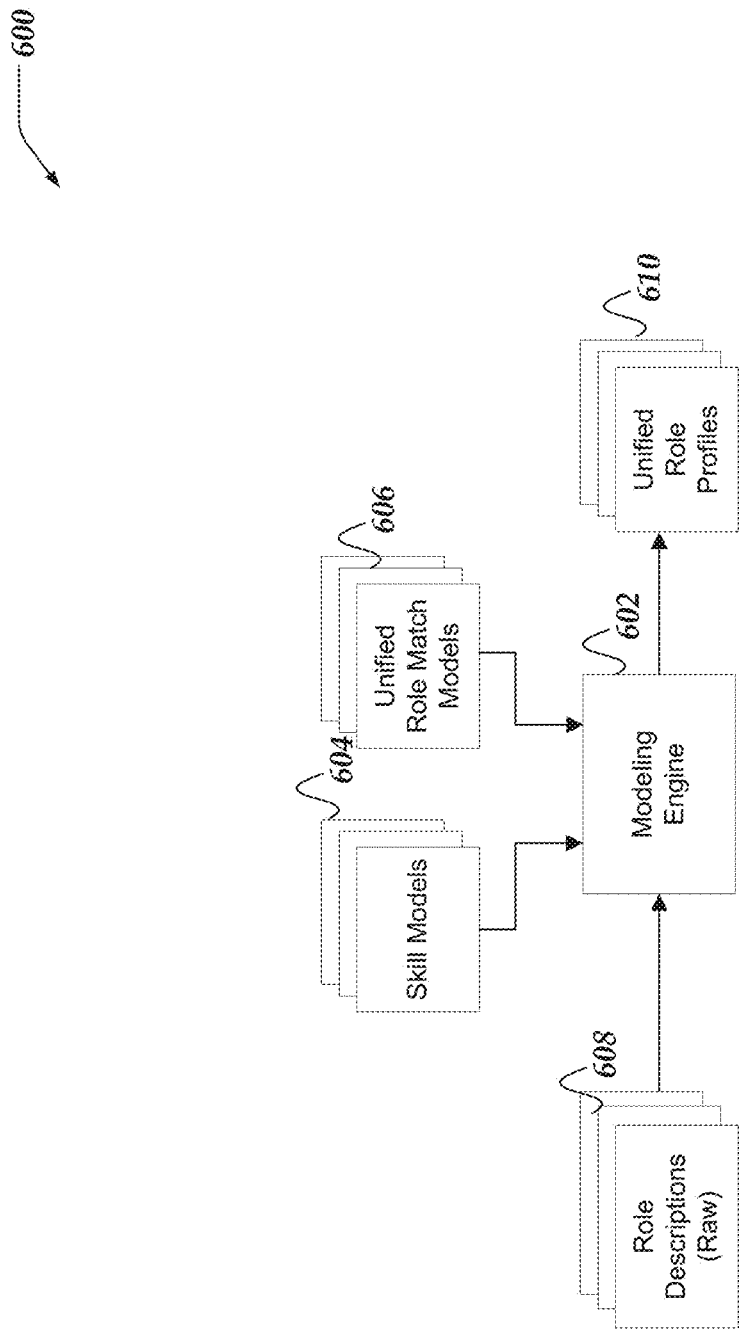
FIG. 6 illustrates a logical representation of a system for predictive learner scores in accordance with one or more of the various embodiments.

FIG. 6 illustrates a logical representation of system 600 for predictive learner scores in accordance with one or more of the various embodiments. In one or more of the various embodiments, system 600 may be a portion of a predictive learner platform directed to generating role profiles from raw role descriptions. Accordingly, in some embodiments, system 600 may be arranged to employ various components, including, modeling engine 602, skill models 604, role match models 606, role descriptions 608, or the like, to provide one or more unified role profiles.

In one or more of the various embodiments, role descriptions 608 may be natural language text information associated with job descriptions, career roles, career paths, or the like. In some embodiments, role descriptions may be taken directly from publicly or privately listed job offerings, or the like. In some embodiments, public role descriptions may be collected from various sources. For example, in some embodiments, predictive learner platforms may be arranged to integrate with various services that may provide publicly available job descriptions, or the like, such as, job advertisement systems, corporation websites, career service centers, employment security departments, or the like. In some embodiments, predictive learner platforms may be integrated with private sources of job offerings, such as, internal job boards of corporations.

In one or more of the various embodiments, skill models 604 may be arranged to extract or identify skill information that may be included in role descriptions 608. In one or more of the various embodiments, one or more text processing models may be employed to determine one or more skills that may be included in the role description text.

In one or more of the various embodiments, skill models may be arranged to determine one or more skill topics in the role description text and map those skill topics to unified skills. Accordingly, in some embodiments, skill models may be arranged to recognize that two or more different skill topic words that may be used in role descriptions may have the same semantic meaning. For example, for some embodiments, a skill model may be arranged to map skill words, such as, 'programmer,' 'hacker,' or 'developer' to a unified skill of 'software developer,' or the like.

In one or more of the various embodiments, skills identified from role descriptions may be included in one or more feature vectors. In some embodiments, feature vectors associated with skills may be referred to as skill vectors. In some embodiments, different skill vectors may be focused on different type of skills, such as, hard skills or soft skills. Accordingly, in some embodiments, each role description may be associated with one or more skill vectors or one or more feature vectors.

In one or more of the various embodiments, role descriptions may include role titles (e.g., job titles). However, in some embodiments, various enterprises, corporations, or otherwise, often use different job titles for the same or similar roles. Accordingly, in some embodiments, role match models 606 may include one or more hybrid NLP models that may matched titles included with role descriptions to a unified collection of role profiles or unified role titles. In some embodiments, role match models may employ NLP models to identify key title words that may be used to match with unified role titles.

In one or more of the various embodiments, skill vectors from individual role descriptions that are mapped to the same unified role title may be aggregated into a skill vectors that may be associated with unified role profiles. Accordingly, in one or more of the various embodiments, unified role profiles that include one or more feature vectors or skill vectors based on a corpus of role descriptions that have been mapped the same unified role title.

Also, in some embodiments, one or more role match models may consider skill vectors determined from role descriptions to validate or influence which unified role title they may be mapped to. Accordingly, in some embodiments, if skill vectors derived from the text of a role description significantly deviate from the aggregate skill vectors associated with the unified role profile it may be mapped to based on its role description title, the mapping based on the role description title may be overridden. In some embodiments, if there may be a mismatch between a role description title and the skills derived from the role description body, the skill vectors may be considered to identify one or more other unified role title that may be better matches for the role descriptions. In some embodiments, if the similarities of the skill vectors associated with role descriptions having mismatched titles exceed a threshold value, modeling engines may be arranged to override the role title match and match role descriptions to unified role profiles based on the skill vectors or other feature vectors.

In one or more of the various embodiments, one or more mismatched role descriptions may be flagged or tagged for later review. Likewise, in some embodiments, modeling engines may be arranged to identify or quarantine mismatched role descriptions to enable administrators or other users to make final determination of which unified role profile a mismatch role description should be associated with.

Figure 7:
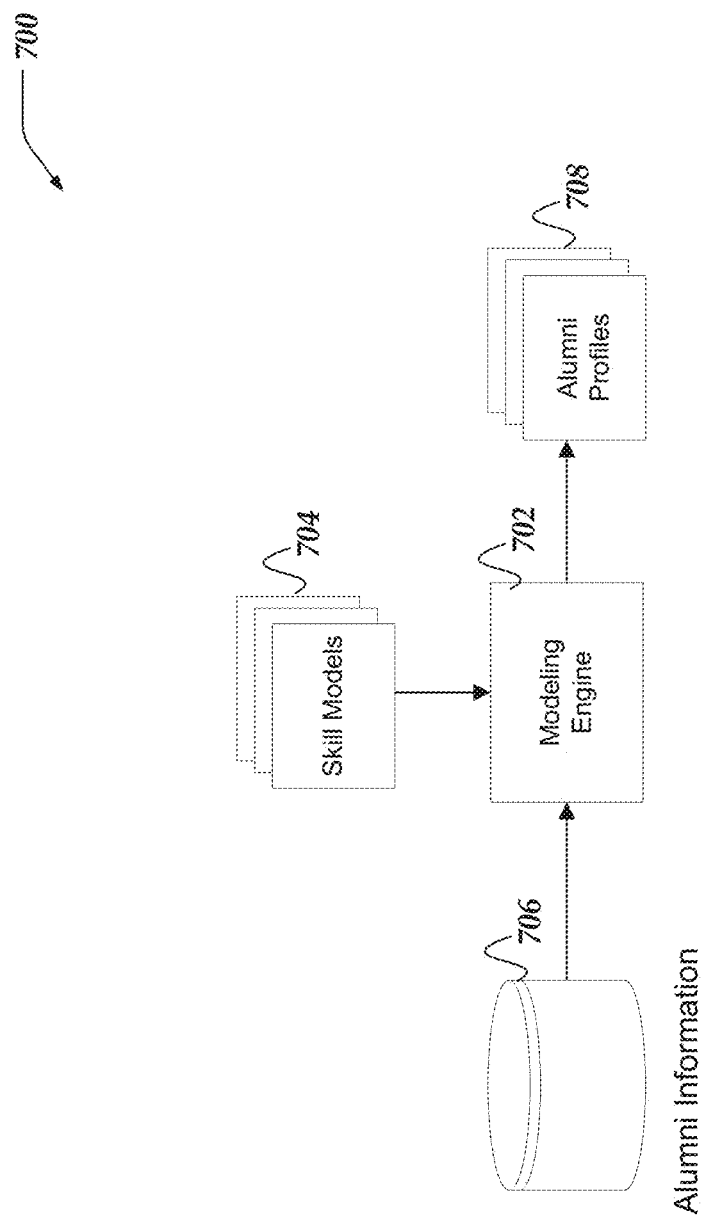
FIG. 7 illustrates a logical representation of a system for predictive learner scores in accordance with one or more of the various embodiments.

FIG. 7 illustrates a logical representation of system 700 for predictive learner scores in accordance with one or more of the various embodiments. In one or more of the various embodiments, system 700 may be considered similar to system 600. Accordingly, in some embodiments, this description will focus on features or characteristics that are different or otherwise not described in the description of system 600 above.

In one or more of the various embodiments, system 700 may be arranged to include modeling engine 702, skill models 704, or the like. In one or more of the various embodiments, skill models 704 may be arranged to produce feature vectors or skill vectors from text information included in alumni information 706. Accordingly, modeling engines may be arranged to generate alumni profiles, such as, alumni profiles 708, that may include features or skills from alumni information. In some embodiments, alumni may be persons that have completed some period of time at an organization. For example, in some embodiments, alumni may be graduates of universities, current or former employs of an organizations, military veterans, current or former volunteers to an organization or the like.

In one or more of the various embodiments, alumni profiles may be arranged to include skills or other features associated with a person's history or current status with one or more organizations. In some embodiments, alumni information may include information from various sources, including, information provided from institutions that may be protected/private information, publicly available information (e.g., press releases, public filings, news articles, social media, or the like), self-reported information, or the like.

In one or more of the various embodiments, additional features included in alumni profiles may include, tenure, promotion history, date of hire, number of jobs held, degrees or certificates, public awards, or the like.

Figure 8:
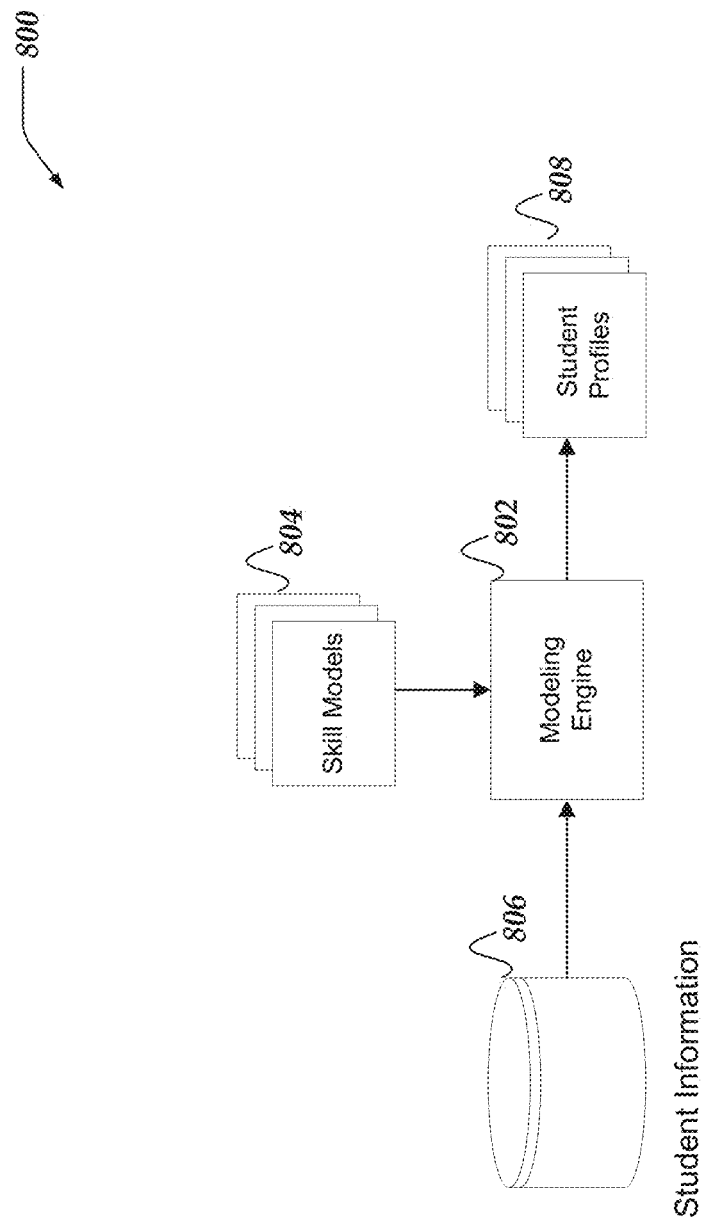
FIG. 8 illustrates a logical representation of a system for predictive learner scores in accordance with one or more of the various embodiments.

FIG. 8 illustrates a logical representation of system 800 for predictive learner scores in accordance with one or more of the various embodiments. In one or more of the various embodiments, system 800 may be considered similar to system 600 or system 700 described above. Accordingly, in some embodiments, this description will focus on features or characteristics that are different or otherwise not described in the description of system 600 or system 700 above.

In one or more of the various embodiments, system 800 may be arranged to include modeling engine 802, skill models 804, or the like. In one or more of the various embodiments, skill models 804 may be arranged to produce feature vectors or skill vectors from text information included in student information 806. Accordingly, modeling engines may be arranged to generate student profiles, such as, student profiles 808, that may include features or skills from alumni information. In some embodiments, students may be considered persons that may be employing a predictive learner platform to evaluate various opportunities or explore pathways that may position them for one or more opportunities. Accordingly, in some embodiments, for brevity and clarity the term students should be considered to include, active students of colleges or universities, former students, employees, prospective employees, persons seeking new opportunities, person planning for the future or other preparing for future opportunities, or the like.

Accordingly, in some embodiments, student information 806 may be considered to the information for a single person. In one or more of the various embodiments, student information may include academic history, employment history, volunteer history, financial history, geographic information/travel history, or the like.

Accordingly, modeling engine 802 may be arranged to employ skill models 804 to generate student profiles. In some embodiments, student profiles may be different the alumni profiles because they are associated with a "live" user of the predictive learner platform rather than being provided in bulk from historical sources. Accordingly, in some embodiments, in addition to feature vectors or skill vectors, student profiles may be arranged to include information that may be relevant to their interactions with predictive learner platforms, such as, login credentials, current contact information, sponsoring organizations (if any), telemetry information associated with a person interaction with one or more predictive learner platform features, feedback information, or the like.

In one or more of the various embodiments, modeling engines may be arranged to employ skill models to extract skill for skill vectors from various types or sources of student information, including, transcripts, course descriptions, course syllabuses, self-reported information, employment history, or the like. In some embodiments, one or more skills or features may be determined from public sources, such as, social media, press releases, new reports, or the like.

Figure 9:
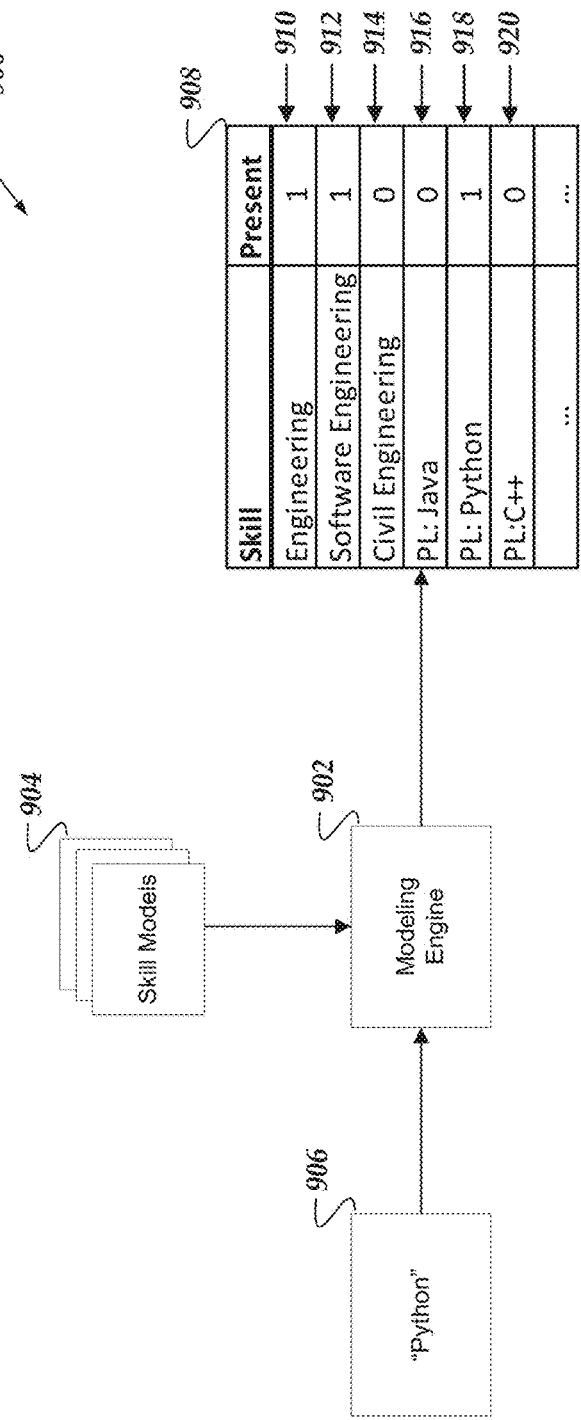
FIG. 9 illustrates a logical representation of a system for predictive learner scores in accordance with one or more of the various embodiments.

FIG. 9 illustrates a logical representation of system 900 for predictive learner scores in accordance with one or more of the various embodiments. In one or more of the various embodiments, modeling engines, such as modeling engine 902 may be arranged to map topic words discovered from student information, alumni information, or role descriptions, to skills included in various skill vectors. In one or more of the various embodiments, modeling engines may be arranged to map one skill topic to more than one skill elements in skill vectors or more than one feature elements in feature vectors.

In one or more of the various embodiments, one or more skills in the same skill vector may overlap. In some embodiments, one or more skills may have hierarchical relationship with one or more other skills. In some embodiments, one or more skills may be broader in scope or more general than other skills. In some embodiments, one or more broader skills may be matched by related specific skills.

In this example, modeling engine 902 may be arranged to employ skill models 904 to map skill topic 906 to skill vector 908. In this example, the value of skill topic 906 is "python," representing a skill of programming with the python programming language. For example, in one or more of the various embodiments, modeling engines may have determined that a student know python based on parsing the course descriptions college courses completed by the student.

Accordingly, in some embodiments, modeling engine 902 may be arranged to add skills to skill vector 908 that may be associated with having a skill of python programming. In this example, modeling engine 902 may employ skill models 904 to add three skills to skill vector 908 for the student. Namely, in this example, engineering skill 910, software engineering skill 912, and programming language: python skill 918.

Thus, in this example, a student that has a skill in python programming will also be assigned a skill of engineering skill 910 (the broadest), software engineering skill 912, and programming language: python skill 918. In contrast, in some embodiments, skill in the python programming would not assign a student civil engineering skill 914. Note, in some embodiments, other skill topics for the student, such as, surveying, structural engineering, soil engineering, or the like, may be discovered independently of the python skill, causing a modeling engine to assign a civil engineering skill to the student corresponding to skill vector 908.

Likewise, in this example, while a skill of python indicates that a student has software engineering skill 912, it does not indicate that the student has programming language: Java skill 916 or programming language: C++, though other skill topics included in the relevant student information may do so.

Note, one of ordinary skill in the art will appreciate that skill vectors may include more or different skill elements than shown here. In some embodiments, the skill elements included in skill vectors may evolve as new skill models, or the like, may be developed. Likewise, one or more skill elements that were favored previously may be determined to be less valuable later for providing useful guidance, predictions, or comparisons. In some embodiments, ongoing machine-learning training of models as well as user feedback may influence the identification of skill topics or if they may be added to skill vectors. Similarly, feature vectors or feature elements may evolve for various reasons, such as, additional information may be processed, machine-learning model training, user feedback, or the like.

Figure 10:
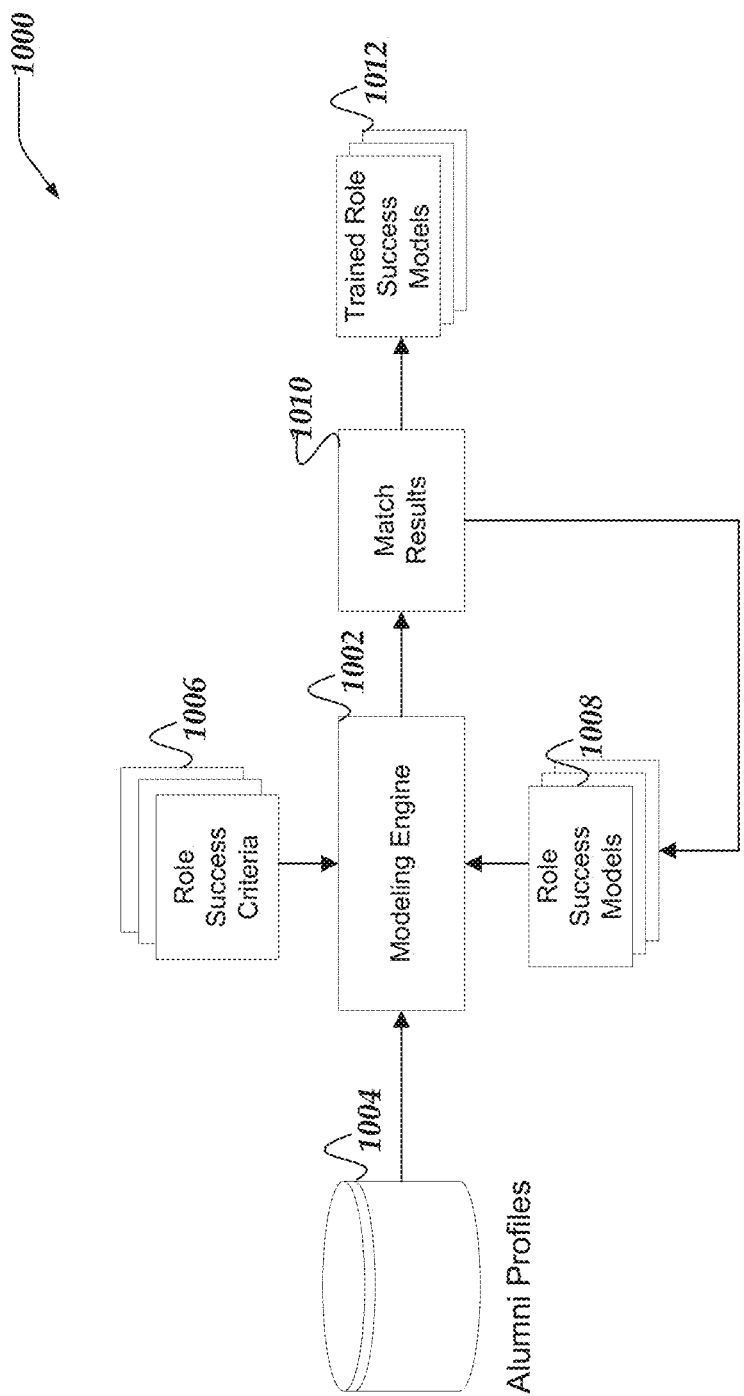
FIG. 10 illustrates a logical representation of a system for predictive learner scores in accordance with one or more of the various embodiments.

FIG. 10 illustrates a logical representation of system 1000 for predictive learner scores in accordance with one or more of the various embodiments. In one or more of the various embodiments, modeling engines, such as, modeling engine 1002 may be arranged to employ a corpus of alumni profiles, such as, alumni profiles 1004 to train one or more role success models, such as, role success models 1008 to match student profiles to various role success criteria, such as, role success criteria 1006. In one or more of the various embodiments, intermediate match results, such as, match results 1010 may be observed to evaluate if one or more role success model are trained to match student profiles to defined success criteria. Accordingly, in some embodiments, modeling engines may be arranged to generated one or more trained role success models, such as, trained role success models 1012, to determine how well a student (based on their student profile) matches the success criteria.

In one or more of the various embodiments, success criteria may vary depending on the roles involved or goals of various involved parties. In some embodiments, success criteria may include, promotion history, tenure, time in same career path, time in same industry, or the like. In some embodiments, certain roles may define success differently than other roles. For example, in some cases, roles where success is related to a willingness to travel, may be associated with success criteria that reflects that a student is willing or able to travel. For example, if a student has traveled from home to attend schools, internships, summer jobs, or the like, it may indicate a willingness to travel or work away from "home" that meets a success criteria for jobs at national companies having distributed worksites such that success depends on a willingness to travel to different sites for career progression. Thus, in one or more of the various embodiments, role success criteria may be associated with unified role profiles.

In one or more of the various embodiments, one or more role success models may be trained for identifying students that match individual criteria elements. For example, in some embodiments, one or more role success models may be trained to for matching tenure while another one or more role success models may be trained to match promotions, time in industry, time in career path, or the like.

Figure 11:
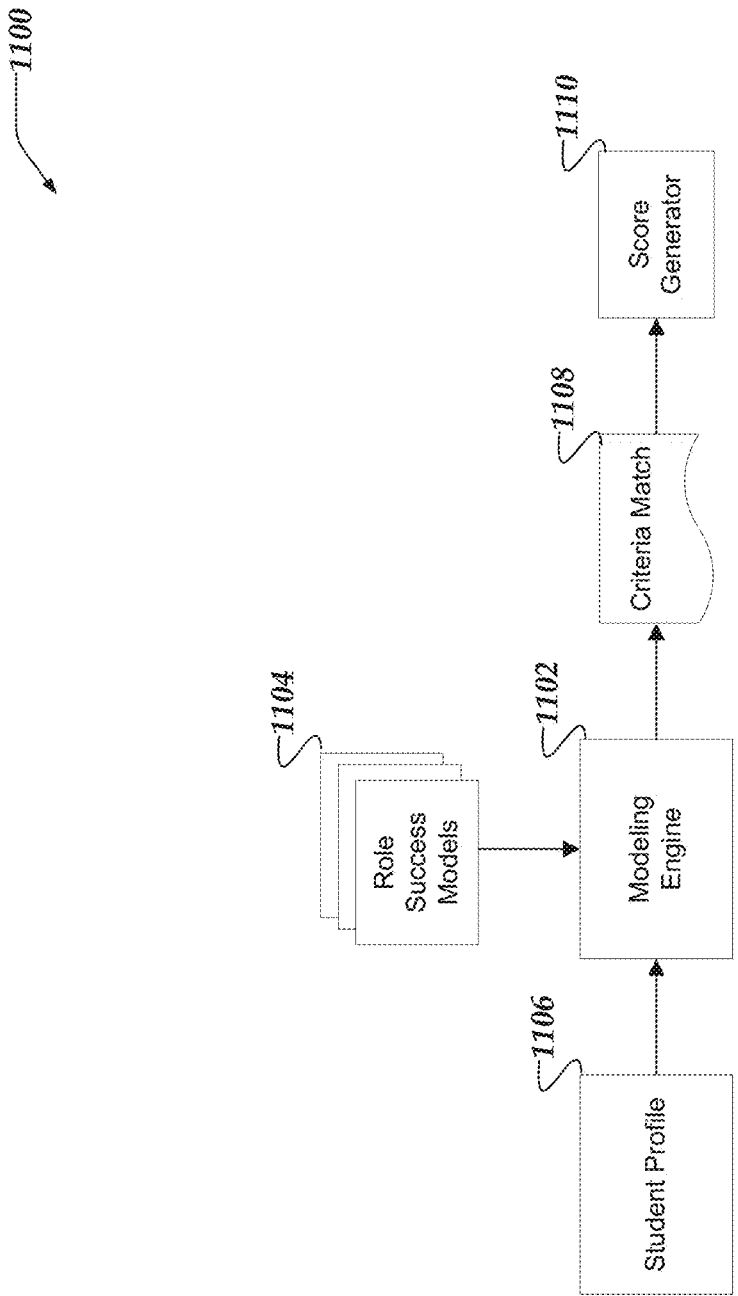
FIG. 11 illustrates a logical representation of a system for predictive learner scores in accordance with one or more of the various embodiments.

FIG. 11 illustrates a logical representation of system 1100 for predictive learner scores in accordance with one or more of the various embodiments. In one or more of the various embodiments, modeling engines, such as, modeling engine 1102 may be arranged to employ one or more role success models, such as, role success models 1104, to evaluate students against success criteria associated with one or more roles. In some embodiments, modeling engines may be arranged to employ score generator 1110 to generate one or more predictive learner scores from criteria match information, such as, criteria match 1108, or the like.

In some embodiments, predictive learner scores may be arranged to human readable or human friendly quantitative representations of how a well a student may match with the success criteria for one or more roles they may be interested pursuing. In some embodiments, predictive learner scores may be represented using a single value such that if the score exceeds a threshold value, the student may be considered a good match for having success at a given role.

Note, in some embodiments, the same student may have different scores for different roles. In some embodiments, the different may be attributed to differences in the skill vectors or features of the student and the skill vectors or features associated with a particular role.

In one or more of the various embodiments, modeling engines may be arranged to weight the impact of one or more individual skills or features based on how well they correlate with the success criteria. Thus, in some embodiments, modeling engines may be arranged to generate report information that include the contribution of various student skills or features to the total score.

Likewise, in some embodiments, modeling engines may be arranged to generate report information that indicate which absent skills or absent features may be weighing down a student score. Also, in some embodiments, modeling engines may be arranged to identify one or more skills or features that may be considered critical requirements based on training the success models. For example, if every successful electrical engineer alumni has completed at least three calculus courses in college, a calculus skill may be determined to a critical skill that may drive an overall score to near zero.

In one or more of the various embodiments, modeling engines may be arranged to enable users (e.g., students, administrators, hiring managers, or the like) to engage in "what-if" analysis that shows how predictive learner scores may change if various skills or features are added or removed from a student profile under consideration. In some embodiments, a user interface may be provided that enable students to compute if gaining certain skills may improve their predictive learner score for a particular role. In some cases, this may be considered pathway evaluation or pathway prediction such that a student may evaluate if their current academic pathway is heading in a good directions. Similarly, in some embodiments, pathway prediction may provide tangible recommendations on how to obtain one or more skills or features the move the student along their desired pathway. For example, in some embodiments, modeling engines may be arranged map skills back to the course work that provides them. Thus, for example, if software engineering is an important skill for a given role pathway, the modeling engines may be arranged to recommend one or more programming language courses, or the like, that may provide the software engineering skill. Accordingly, in some embodiments, student may track their progress as well as be recommended actions they may take to advance their progress.

Also, in some embodiments, modeling engines may be arranged to compare a student's profile to role profiles, alumni profiles, or the like, to enable a student to evaluate how they match up to other pathways. Likewise, in some embodiments, students may be enabled to observe the skills or features they may need to have or develop to success in various pathways. Thus, in some embodiments, students may be able determine if they would like to proceed in a given pathway. For example, for some embodiments, a student interested in following a data scientist career pathway may discover that a critical success criteria is an advanced degree. Thus, in this example, if the student is uninterested in pursing an advanced degree, they may see how their current skills, interests, or future plans align with other related pathways, such as, business analyst, software engineer, statistician, actuary, or the like.

Generalized Operations

FIGS. 12-19 represent generalized operations for predictive learner score in accordance with one or more of the various embodiments. In one or more of the various embodiments, processes 1200, 1300, 1400, 1500, 1600, 1700, 1800, and 1900 described in conjunction with FIGS. 1-11 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 12-19 may perform actions for predictive learner score in accordance with at least one of the various embodiments or architectures such as those described in conjunction with FIGS. 1-11. Further, in one or more of the various embodiments, some or all of the actions performed by processes 1200, 1300, 1400, 1500, 1600, 1700, 1800, and 1900 may be executed in part by ingestion engine 322, modeling engine 324, recommendation engine 328, or the like.

Figure 12:
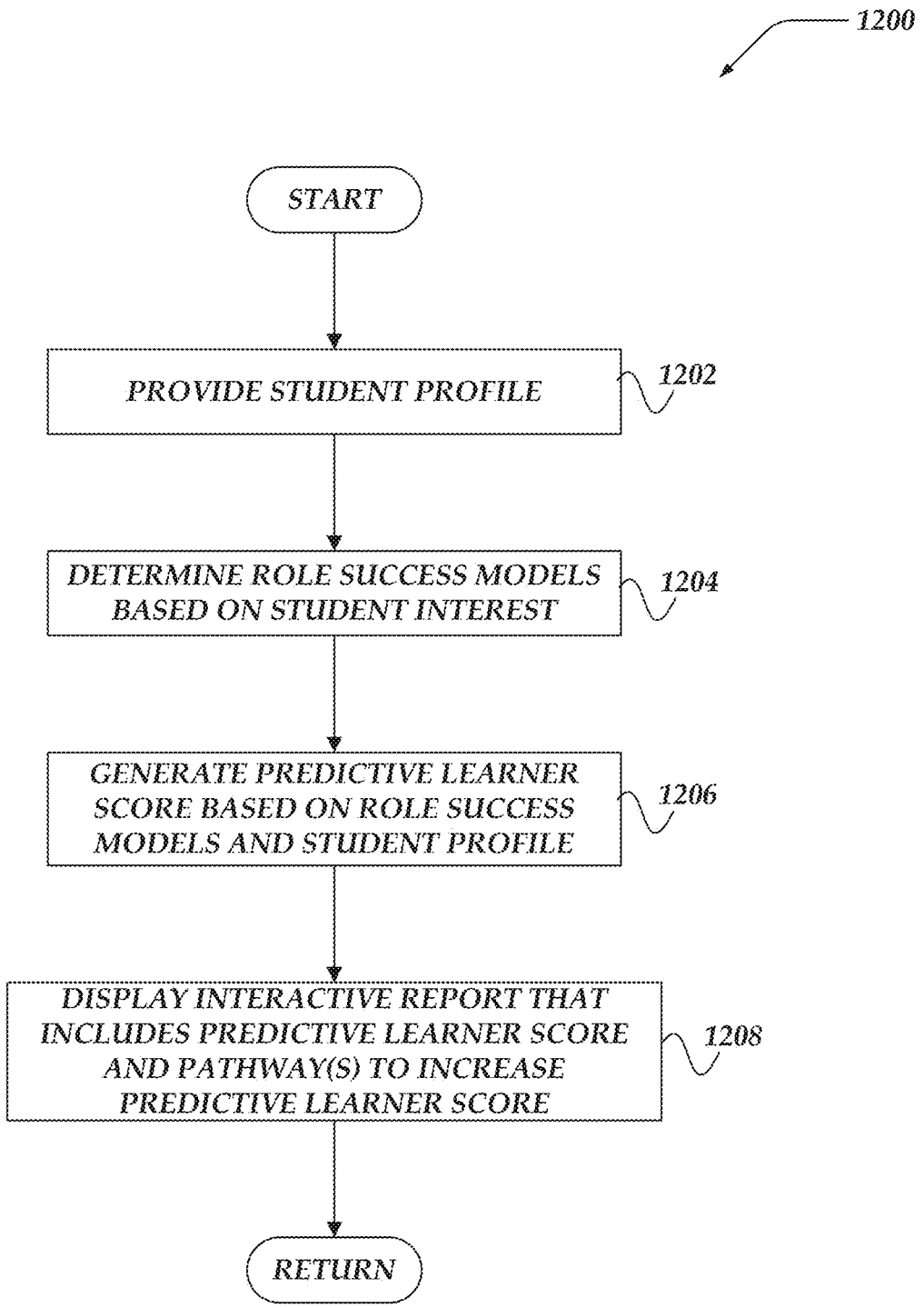
FIG. 12 illustrates an overview flowchart for a process for predictive learner scores in accordance with one or more of the various embodiments.

FIG. 12 illustrates an overview flowchart for process 1200 for predictive learner scores in accordance with one or more of the various embodiments. After a start block, at block 1202, in one or more of the various embodiments, a student profile may be provided to a modeling engine. At block 1204, in one or more of the various embodiments, modeling engines may be arranged to determine one or more role success models based on student interest. At block 1206, in one or more of the various embodiments, modeling engines may be arranged to generate predictive learner scores for the student based on the one or more role success models and the student profile. At block 1208, in one or more of the various embodiments, modeling engines may be arranged to generate information for interactive reports the include the predictive learner scores and one or more pathways to success.

Next, in one or more of the various embodiments, control may be returned to a calling process.

Figure 13:
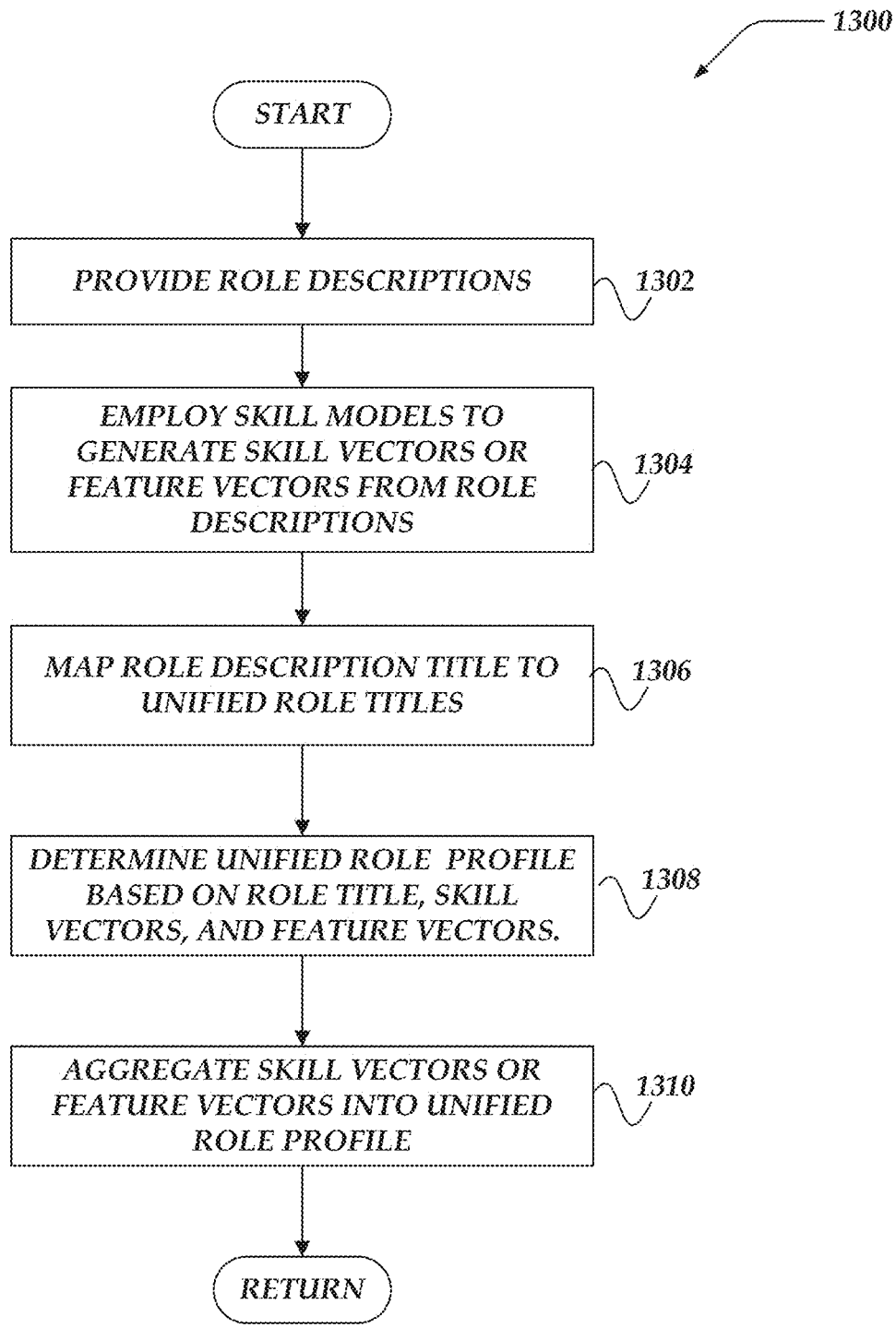
FIG. 13 illustrates a flowchart for a process for predictive learner score in accordance with one or more of the various embodiments.

FIG. 13 illustrates a flowchart for process 1300 for predictive learner score in accordance with one or more of the various embodiments. After a start block, at block 1302, in one or more of the various embodiments, one or more role descriptions may be provided a modeling engine. In one or more of the various embodiments, role descriptions may be job descriptions that may be provided by employers. In some embodiments, as described above, predictive learner platforms may be arranged to collect role information (e.g., job information, career information, or the like) from a variety of sources.

At block 1304, in one or more of the various embodiments, the modeling engine may be arranged to generate one or more skill vectors or one or more feature vectors from the one or more role descriptions. In one or more of the various embodiments, modeling engines may be arranged to skill models that are arranged to perform various analysis to identify skill words, skill topics, skill indicators (e.g., status codes, or the like) from role description information. In one or more of the various embodiments, skill models for processing role descriptions may be separate from skill models for processing alumni information or student information, however, they may produce results that are in the same feature space as skill models for processing alumni information or student information. See, skill model discussion below for more detail regarding skill models and their use.

At block 1306, in one or more of the various embodiments, the modeling engine may be arranged to map role description titles to unified role titles. In one or more of the various embodiments, role descriptions typically include a role title, job title, position title, or the like. However, in some cases, different organizations that publish role descriptions often use different role titles for roles that may otherwise be considered the same. For example, a first employer may use a role title of 'senior software developer' while a second employer may use a role title of 'Programmer III' even though both roles may be equivalent in terms of skills or success criteria.

Accordingly, in some embodiments, modeling engines may be arranged to provide unified role title matching models that are designed to map role description titles to unified role titles. In some embodiments, role title matching models may be NLP matching models or semantic matching models, or hybrid combinations of different types of models or heuristics to map role description titles to unified role titles.

At block 1308, in one or more of the various embodiments, the modeling engine may be arranged to determine unified role profiles for the role descriptions based on the unified role title, one or more skill vectors, or one or more feature vectors, or the like. In one or more of the various embodiments, modeling engines may be arranged to generate a collection of unified role profiles that represent the skills or features for a given role.

Accordingly, in one or more of the various embodiments, modeling engines may be arranged to assign a role description to a unified role profile based on the information extracted from a role description. In some embodiments, the unified role title determined from the role description title may be considered for determining which unified role profile should be used. However, in some embodiments, modeling engines may be arranged to consider one or more skill vectors, one or more feature vectors, or portions thereof to evaluate if a role description should be associated with a particular unified role.

Accordingly, in some embodiments, if one or more of the skill vectors or feature vectors may be determined to deviate from one or more skill vectors or one or more feature vectors associated with an existing unified role profile, the modeling engines may be arranged determine that the unified role title should not be relied on to select a unified role for this role description. In some embodiments, modeling engines may be arranged to discard role descriptions that fail to unambiguously map to a unified role because of a skill vectors mismatch or otherwise. Also, in one or more of the various embodiments, modeling engines may be arranged to set aside role descriptions that fail to unambiguously map to a unified role and tag or mark them for further review by a user.

At block 1310, in one or more of the various embodiments, the modeling engine may be arranged to aggregate the one or more skill vectors or one or more feature vectors in the unified profiles. In one or more of the various embodiments, modeling engines may be arranged to add the one or more skill vectors or feature vectors to be included in a unified role profile.

In some embodiments, modeling engines may be arranged to keep track of a hit count which may represent the number of times a particular skill may be added to a unified role profile. Thus, in some cases, one or more other models, such as, role success models, or the like, may employ hit counts for some skills as weighting factors.

Thus, in some embodiments, modeling engines may be arranged to aggregate skill vectors or feature vectors determined from individual role descriptions to one or more unified skill vectors or unified feature vectors that may be included in the unified role profile for a given role.

Next, in one or more of the various embodiments, control may be returned to a calling process.

Figure 14:
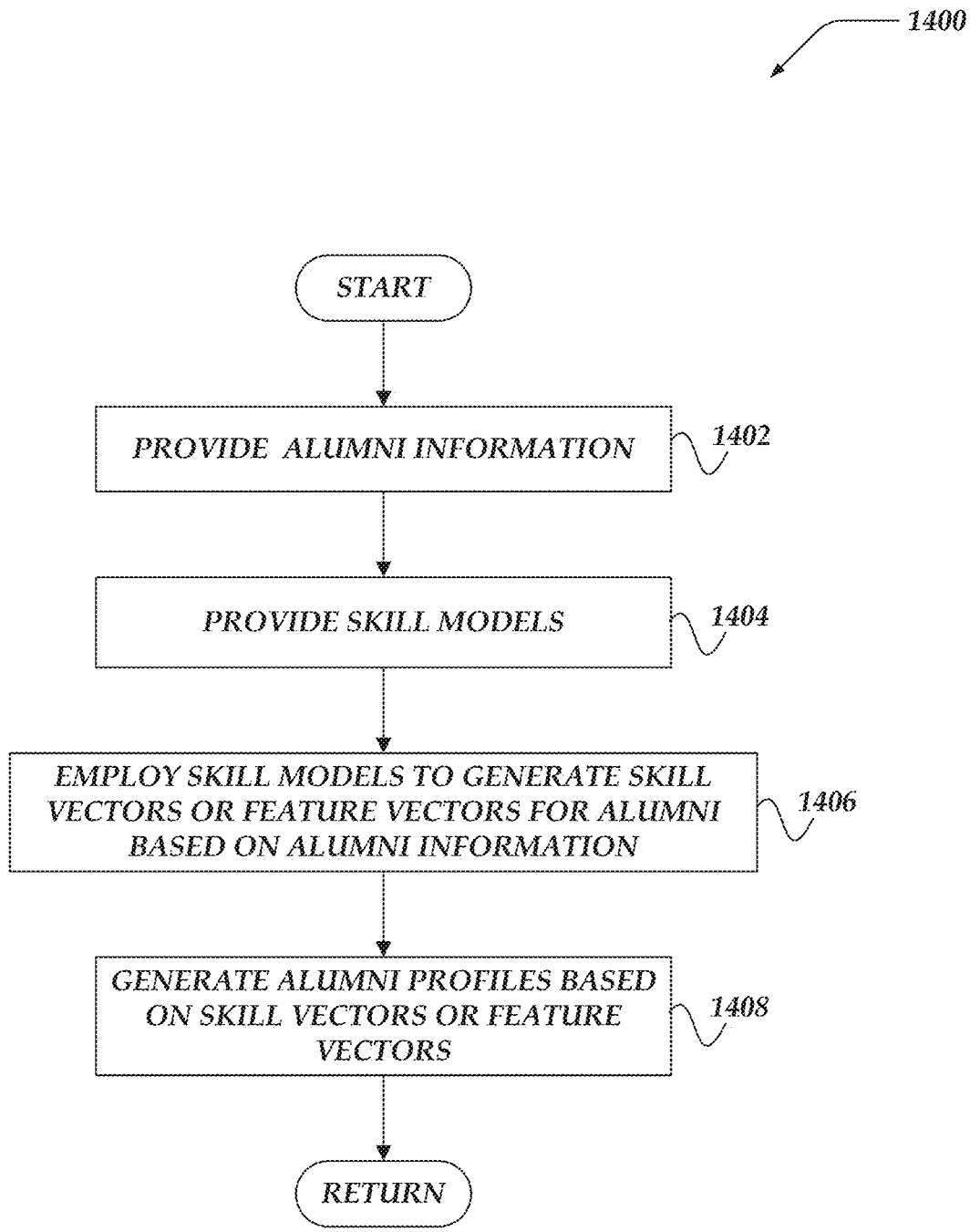
FIG. 14 illustrates a flowchart for a process for generating predictive learner scores in accordance with one or more of the various embodiments.

FIG. 14 illustrates a flowchart for process 1400 for generating predictive learner scores in accordance with one or more of the various embodiments. After a start block, at block 1402, in one or more of the various embodiments, alumni information may be provided to a modeling engine. In one or more of the various embodiments, alumni information may include education history, employment history, provided by universities or employers. Also, in some embodiments, some alumni information may be collected from public sources, such as, resume boards, social media, news reports, press releases, public records (e.g., professional licensing information, corporation financial filings, or the like), other biographical sources, or the like.

In one or more of the various embodiments, modeling engines may be arranged to process the alumni information for each individual alumnus separately. Though, in some embodiments, the processing of alumni information may be done in parallel using one or more modeling engines.

At block 1404, in one or more of the various embodiments, the modeling engine may be arranged to provide one or more skill models. In one or more of the various embodiments, skill models may be considered models designed for extracting skill words or skill topics from information text sources. In some embodiments, different types of information sources may be associated with different skill models. In some embodiments, skill models may be NLP models, while in other cases, skill models may use heuristics or rules to recognize some skills or features. For example, in some embodiments, integration with data services of universities, corporations, employment agencies, or the like, may provide information formatted such that ingestion may be only require data validation rather than requiring skill words or skill topics to be extract from lines, paragraphs, or pages or natural language text.

Also, in some embodiments, one or more different or separate skill models may be arranged to discover skills for different skill vectors. For example, hard skill vectors may have different skill models that soft skill vectors.

Also, in one or more of the various embodiments, one or more skills in a skill vector or one or more features in a feature vector may be associated with one or more tag, label, status code, or the like, that may be discovered with a rules or pattern matching that looks for particular values in known fields of one or more portions of the alumni information. For example, if the alumni information includes a CVS file from an employed where the fourth column is salary, tenure, date of promotion, or the like, specialized skill models may be arranged to directly extract such information rather using NLP topic finding techniques, or the like.

At block 1406, in one or more of the various embodiments, the modeling engine may be arranged to employ the one or more skill models to generate skill vectors or feature vectors for individual alumni based on the alumni information. In one or more of the various embodiments, modeling engines may be arranged to feed text from various alumni information sources to the one or more skill models. In some embodiments, if a skill model determines or infers from the text information that an alumnus has a particular skill, that skill may be added to the appropriate skill vector or feature vector.

At block 1408, in one or more of the various embodiments, the modeling engine may be arranged to generate one or more alumni profiles based on the one or more skill vectors or the one or more feature vectors. In some embodiments, if the skill models and the alumni source information may be exhausted, the skill vectors or feature vectors generate for each alumnus may be added to an alumnus profile that corresponds to the alumni.

In one or more of the various embodiments, alumni profiles may be data structures that include the skill vectors or feature vectors as well as other standalone features or attributes of each individual alumni member.

Next, in one or more of the various embodiments, control may be returned to a calling process.

Figure 15:
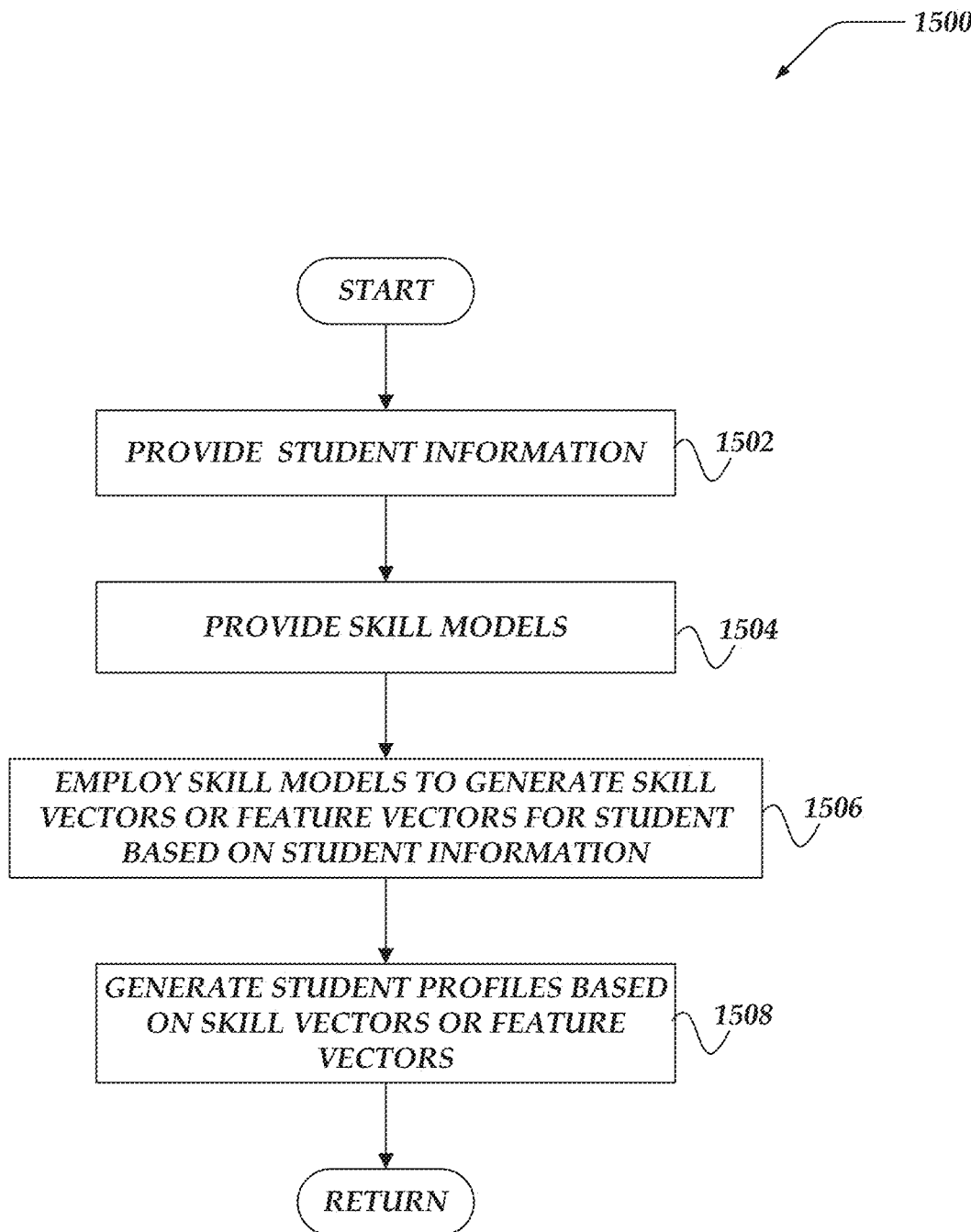
FIG. 15 illustrates a flowchart for a process for generating predictive learner scores in accordance with one or more of the various embodiments.

FIG. 15 illustrates a flowchart for process 1500 for generating predictive learner scores in accordance with one or more of the various embodiments. After a start block, at block 1502, in one or more of the various embodiments, student information may be provided to a modeling engine. As described above, student information may be information related to coursework, school activities, syllabuses of courses, public records, or information of other public sources. Also, in some embodiments, student information may include self-reported information, such as, resumes, or the like.

In one or more of the various embodiments, modeling engines may be arranged to process the student information for each individual student separately. Though, in some embodiments, the processing of student information may be done in parallel using one or more modeling engines.

At block 1504, in one or more of the various embodiments, the modeling engine may be arranged to provide one or more skill models. Similar to as described above for process 1400, modeling engines may be arranged to provide one or more skill models for discovering skills or features from student information. For brevity the description for block 1404 above is not repeated here.

At block 1506, in one or more of the various embodiments, the modeling engine may be arranged to employ the one or more skill models to generate skill vectors or feature vectors for individual students based on the student information. Similar to as described above for process 1400, modeling engines may be arranged to generate skill vectors or feature vectors for individual students. For brevity, the description for block 1406 above is not repeated here.

At block 1508, in one or more of the various embodiments, the modeling engine may be arranged to generate one or more student profiles based on the one or more skill vectors or the one or more feature vectors. Similar to as described above for process 1400, modeling engines may be arranged to generate student profiles for each individual student. For brevity, the description for block 1408 above is not repeated here.

Also, in one or more of the various embodiments, modeling engines may be arranged to enable students to self-report information that may be included in student profiles.

Also, in one or more of the various embodiments, students that may be registered with the predictive learner platform may be enabled to view their personal student profiles. Accordingly, in some embodiments, modeling engines may be arranged to collect feedback from students regarding the quality or accuracy of their own student profile.

Next, in one or more of the various embodiments, control may be returned to a calling process.

Figure 16:
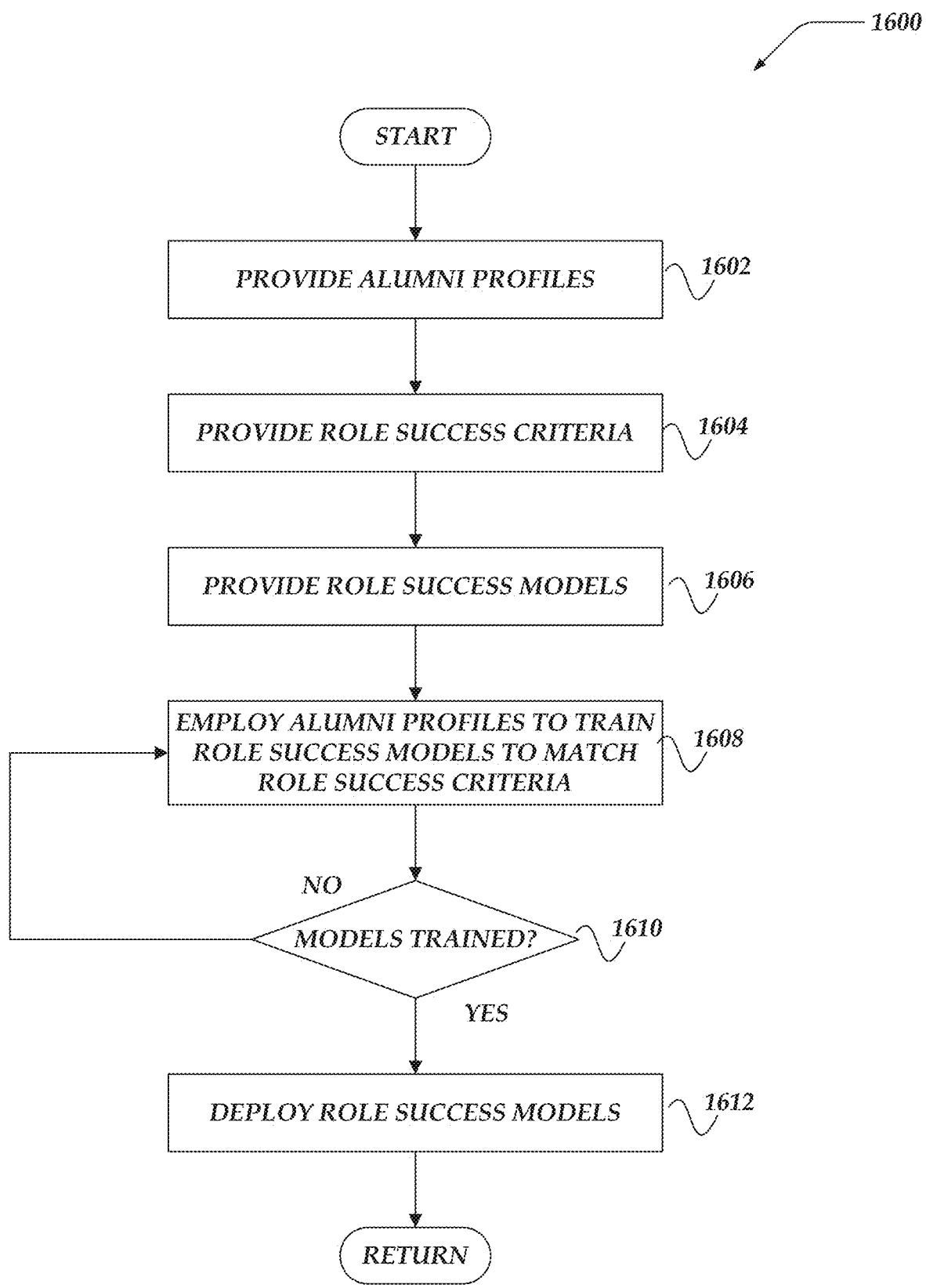
FIG. 16 illustrates a flowchart for a process for generating predictive learner scores in accordance with one or more of the various embodiments.

FIG. 16 illustrates a flowchart for process 1600 for generating predictive learner scores in accordance with one or more of the various embodiments. After a start block, at block 1602, in one or more of the various embodiments, one or more alumni profiles may be provided to a modeling engine. As described above, alumni profiles may be generated based on skill models and alumni information. In one or more of the various embodiments, the alumni profile may include one or more skill vectors or feature vectors that modeling engines employ to train role success models.

At block 1604, in one or more of the various embodiments, role success criteria may be provided to the modeling engine. In one or more of the various embodiments, role success criteria may be defined based one or more observable or measurable features of individual alumni. Also, in some embodiments, role success criteria may be selected such that alumni profiles may represent them in feature vectors or other attributes of the alumni profile. As described above, role success criteria may include various features are known or expected to correlate with success in a given role.

In some embodiments, organizations that may be hiring employees may customize success criteria to include one or more features the organization determines to be important. Likewise, in some embodiments, industries or some roles may include success criteria that may be different from other industries or roles.

At block 1606, in one or more of the various embodiments, one or more role success models may be provided to the modeling engine. Initially, in some embodiments, role success model may require machine-learning training to train them to match skill vectors or feature vectors with success criteria. Thus, in some embodiments, each success criteria may be associated with a role success model. Also, in some embodiments, role success models may be trained independently for different roles. For example, in some embodiments, a role success model for software engineers may different than a role success model for product managers, and so on.

Accordingly, in some embodiments, modeling engines may be arranged to index role success models by unified roles, success criteria, or both.

At block 1608, in one or more of the various embodiments, the modeling engine may be arranged to employ the alumni profiles to train the role success models to match the role success criteria. As described above, alumni profiles include one or more skill vectors or one or more feature vectors that were determined by skill models processing alumni information. In one or more of the various embodiments, the alumni skill vectors or feature vectors may be arranged to being the same feature space as skill vectors or feature vectors associated with student profiles. Thus, in some embodiments, alumni profiles may be employed for training role success models for use with student profiles.

At decision block 1610, in one or more of the various embodiments, if the role success models may be trained, control may flow to block 1612; otherwise, control may be loop back to block 1608. In one or more of the various embodiments, a combination of assisted learning, expert labeling, crowd sourcing, or the like. In some embodiments, role success models may be associated with a testing or veracity criteria that may be evaluated by modeling engines to determine if a role success model is trained.

At block 1612, in one or more of the various embodiments, the modeling engine may be arranged to deploy the one or more trained role success models. In one or more of the various embodiments, role success models that may be determined to be trained within one or more defined tolerances may be tagged, marked, or list as ready for production.

In one or more of the various embodiments, trained role success models may be returned to training or discarded on a regular basis to ensure they remain effective. For example, in some embodiments, alumni information, student information, or role descriptions may be continuously changing. For example, alumni information may be changing as access to new alumni may be provided. Likewise, for example, new students, new student information, new role descriptions, or the like, may be continuously added to a predictive learner platform.

Accordingly, in some embodiments, modeling engines may be arranged to randomly select one or more role success models for evaluation or retraining.

Next, in one or more of the various embodiments, control may be returned to a calling process.

Figure 17:
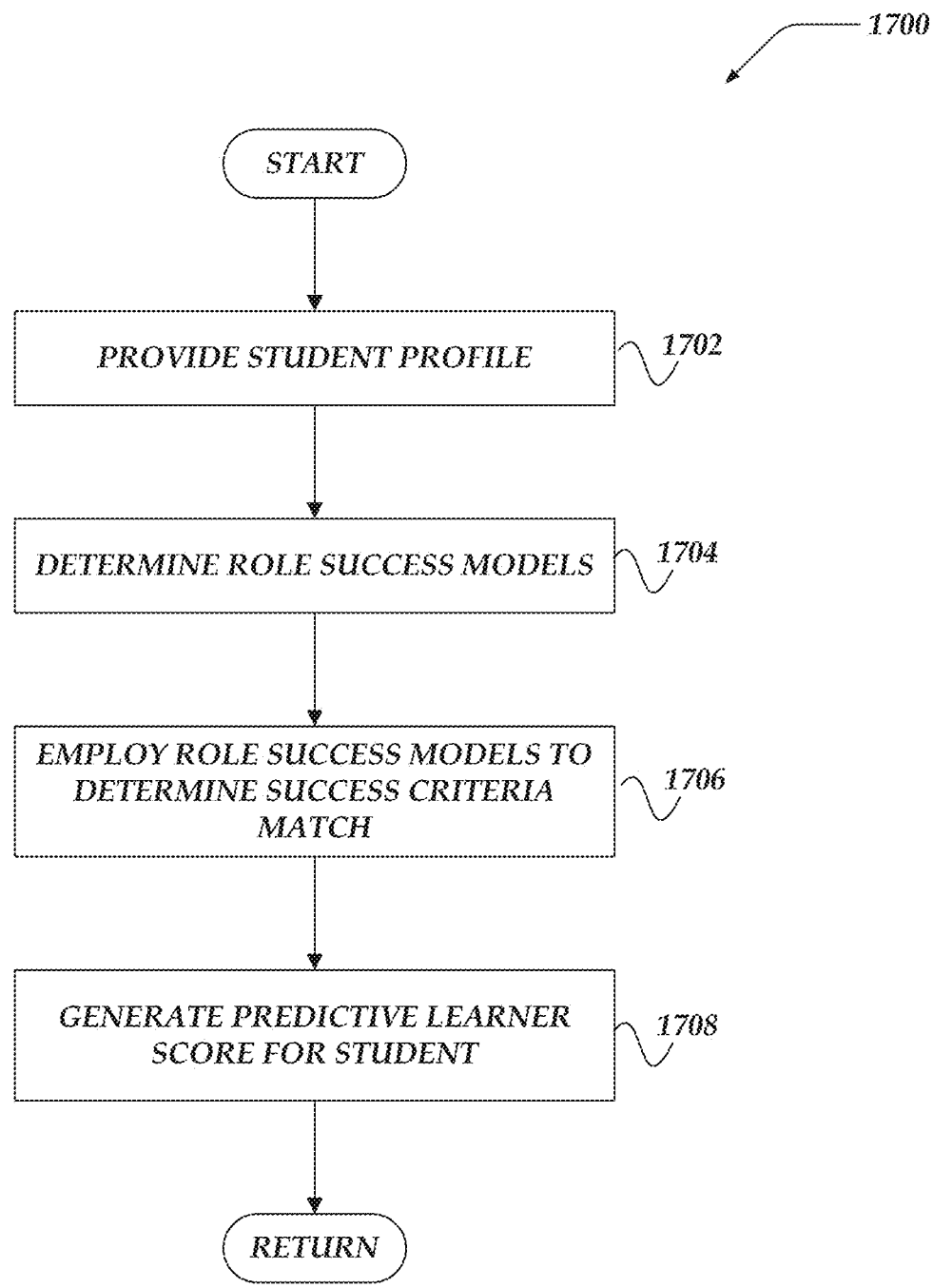
FIG. 17 illustrates a flowchart for a process for generating predictive learner scores in accordance with one or more of the various embodiments.

FIG. 17 illustrates a flowchart for process 1700 for generating predictive learner scores in accordance with one or more of the various embodiments. After a start block, at block 1702, in one or more of the various embodiments, a student profile may be provided to a modeling engine. As described above, modeling engines may be arranged to employ skill models to generate student profiles from student information.

At block 1704, in one or more of the various embodiments, the modeling engine may be arranged to determine one or more role success models. In one or more of the various embodiments, modeling engines may be arranged to determine one or more role success models based on one or more role profiles or role pathways a student may have associated with their student profile. Likewise, in some embodiments, modeling engines may be arranged to automatically select one or more role success models based on comparing skill vectors in the student profile to skill vectors associated with role profiles. Accordingly, in some embodiments, role success models corresponds to role profiles associated with skill vectors that may be considered similar to skill vectors of the student may be determined.

At block 1706, in one or more of the various embodiments, the modeling engine may be arranged to employ the one or more role success models to evaluate how well the student profile matches the success criteria for one or more roles. In one or more of the various embodiments, modeling engines may be arranged to run skill vectors or feature vectors of the student through the determined role success models to determine how closely the student matches the success criteria corresponding to the one or more role. In some embodiments, role success criteria that the role success models were trained to match may be associated with the role success models. Thus, in some embodiments, each role success model may include its current success criteria. In some embodiments, different portions of the success criteria may be associated with different role success models. Thus, in some cases, each criterion may be evaluated independently using separate role success models that were trained for the role and the success criteria. In one or more of the various embodiments, the number or kind of criteria may vary depending on the role profile.

At block 1708, in one or more of the various embodiments, the modeling engine may be arranged to generate predictive learner scores for the student. In one or more of the various embodiments, modeling engines may be arranged to interpret the criteria match results to generate predictive learner scores. In some embodiments, modeling engines may be arranged to employ one or more score generators to generate a final score based on the criteria match results. In some embodiments, each criteria match result may be considered a partial score may be combined the modeling engine into a single score.

In one or more of the various embodiments, the particular rules, heuristics, formulas, or the like, used to generate a human readable score from the matched success criteria may vary depending on various factors, including, the type of criteria match, an importance or weight of the different criteria matches, the strength of quality of the criteria match, or the like.

Likewise, in some embodiments, the particular rules, heuristics, formulas, or the like, used to generate a human readable score may depending on the type of predictive learner scores being generated. For example, in some embodiments, predictive learner scores may be represented using a continuous or pseudo-continuous range, such as, 0-500, or the like. Thus, for this example, modeling engines may be arranged to generate or estimate a distribution curve of predictive learner scores based on training data (e.g., alumni profiles) or other student profiles. In other cases, modeling engines may be arranged to assign score/weight coefficients to each partial score and sum them together to produce predictive learner scores. In some embodiments, modeling engines may be arranged to enable users to choose the predictive learner score representation they prefer.

Also, modeling engines may be arranged to generate one or more visualization, such as, bar charts, pie charts, or the like, to represent predictive learner scores to users.

Next, in one or more of the various embodiments, control may be returned to a calling process.

Figure 18:
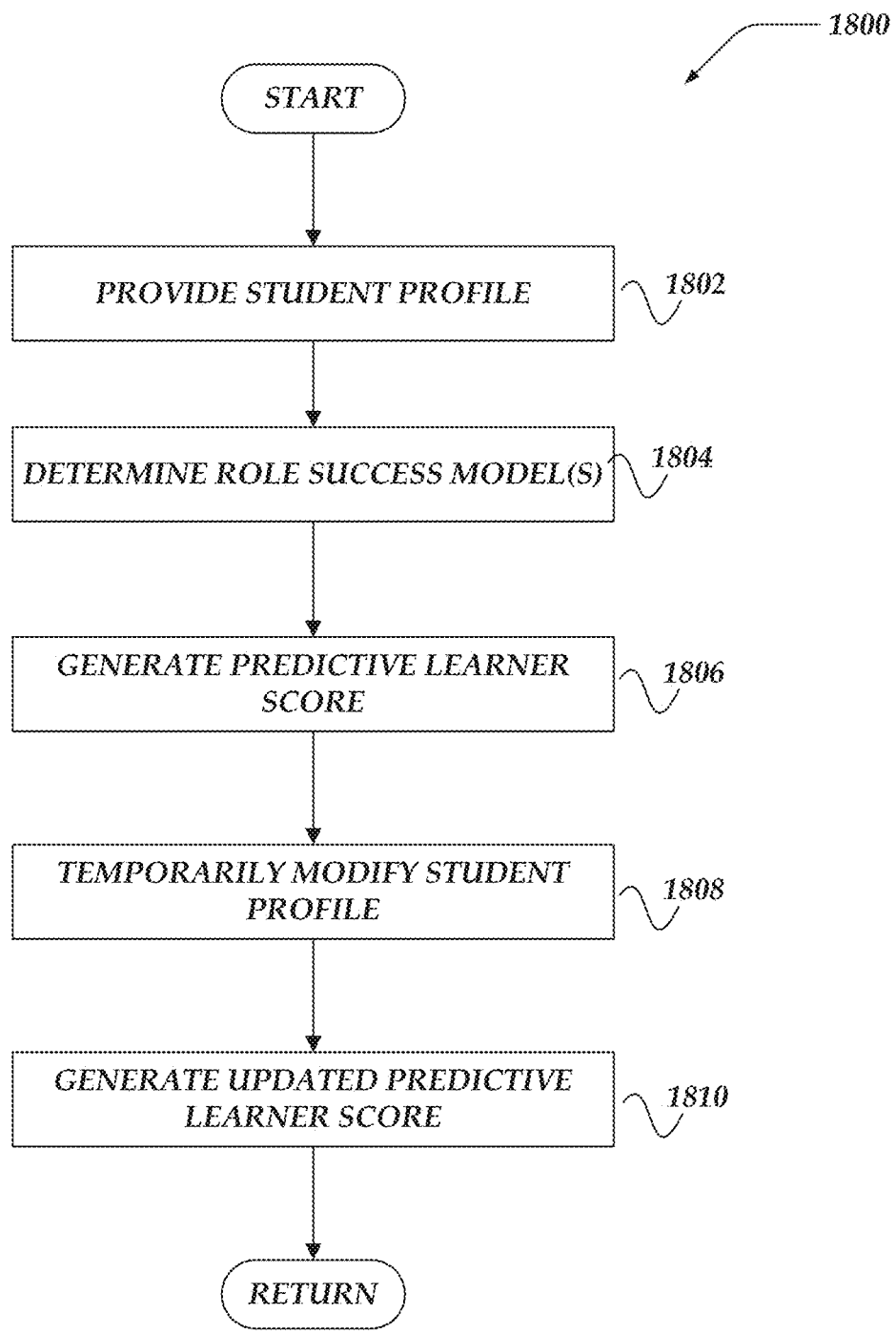
FIG. 18 illustrates a flowchart for a process for generating predictive learner scores in accordance with one or more of the various embodiments.

FIG. 18 illustrates a flowchart for process 1800 for generating predictive learner scores in accordance with one or more of the various embodiments. After a start block, at block 1802, in one or more of the various embodiments, a student profile may be provided to a modeling engine. As described above, users, including students, career counselors, recruiting staff, or the like, may select a student profile for consideration. In some embodiments, if a student may be accessing a predictive learner platform, their personal student profile may be automatically provided to the modeling engine.

At block 1804, in one or more of the various embodiments, the modeling engine may be arranged to determine one or more role success models. In some embodiments, the student profile may be configured to identity one or more roles or role pathways based on student input. Also, in some embodiments, modeling engines may be arranged to recommend one or more roles based on matching skill vectors in the student profile with skill vectors included in role profiles.

At block 1806, in one or more of the various embodiments, the modeling engine may be arranged to generate a predictive learner score for the student profile. As described above, modeling engine may be arranged to employ role success models to determine predictive learner scores based on the skill vectors or feature vectors included in the student profile.

At block 1808, in one or more of the various embodiments, the modeling engine may be arranged to temporarily modify the student profile. In one or more of the various embodiments, modeling engines may be arranged to provide user interfaces that enable students to temporarily modify one or more variables in the student profiles.

For example, in some embodiments, modeling engines may be arranged to provide a user interface that enables students to add or remove skills from skill vectors or features from feature vectors. In some embodiments, if the modification is to a self-reported skill or feature, the modeling engine may be arranged to enable the student to include the change in the student profile. Otherwise, in some embodiments, for skills or feature determined from data sources, students may be restricted from making persistent changes to those skills or features. Thus, in some embodiments, if performing what-if analysis, changes made to skill vectors or feature vectors may be consider temporary such that the changes may automatically revert if the student finished the what-if analysis.

At block 1810, in one or more of the various embodiments, the modeling engine may be arranged to generate an updated predictive learner score based on the modified student profile. In one or more of the various embodiments, modeling engines may be arranged to generate predictive learner scores with the temporary skill or feature changes in the student profile.

Accordingly, in some embodiments, the student or other users may be enabled to observe how different skills or features would impact their predictive learner scores.

Next, in one or more of the various embodiments, control may be returned to a calling process.

Figure 19:
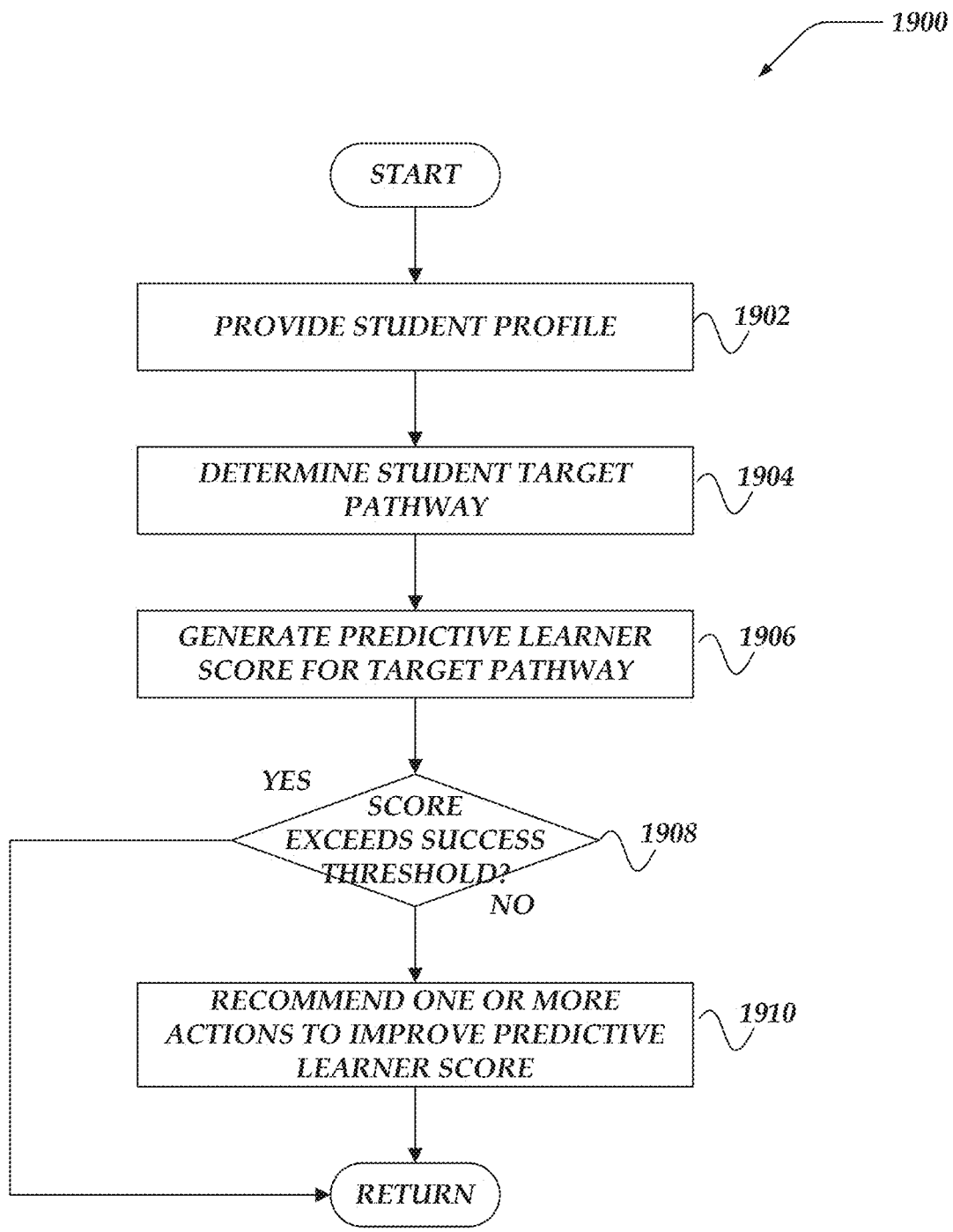
FIG. 19 illustrates a flowchart for a process for generating predictive learner scores in accordance with one or more of the various embodiments.

FIG. 19 illustrates a flowchart for process 1900 for generating predictive learner scores in accordance with one or more of the various embodiments. After a start block, at block 1902, in one or more of the various embodiments, a student profile may be provided to a modeling engine. As described above, modeling engines may be arranged to generate student profiles for individual students based on their student information.

At block 1904, in one or more of the various embodiments, the modeling engine may be arranged to determine one or more target pathways for the student corresponding to the student profile. In one or more of the various embodiments, predictive learner platforms may be arranged to provide user interfaces that enable students to select from among one or more available role profiles. Accordingly, in some embodiments, each role profile may be associated with one or more pathways of associated with finding success at obtaining a given or finding success in a given role.

In one or more of the various embodiments, modeling engines may be arranged to recommend one or more pathways or role profiles based on comparing skill vectors in the student profile to skill vectors associated with role profiles. Accordingly, in some embodiments, modeling engines may be arranged to identify one or more role profiles that the user's current skill vectors or feature vectors may indicate that the student may have an affinity to a given role. For example, for some embodiments, if the student skill vectors partially match skill vectors in one or more role profiles, pathways associated with one or more of those role profiles may be recommended to a user.

Further, in some embodiments, modeling engines may be arranged to enable students to self-report one or more roles they may be interested. Accordingly, in some embodiments, the self-reported roles of interest may be included in student profiles.

At block 1906, in one or more of the various embodiments, the modeling engine may be arranged to generate predictive learner scores for the one or more target pathways. As described above, modeling engines may be arranged to generate predictive learner scores for the roles associated with the target pathways.

At decision block 1908, in one or more of the various embodiments, if the predictive learner score exceeds a success threshold, control may be returned to a calling process; otherwise, control may flow to block 1910. In one or more of the various embodiments, student profiles may closely match the success criteria associated with the target pathways such that the modeling engine may be unable to provide meaningful recommendation to improve a predictive learner score for particular roles.

At block 1910, in one or more of the various embodiments, the modeling engine may be arranged to recommend one or more actions the student may take to improve their predictive learner scores. In one or more of the various embodiments, modeling engines may be arranged to compare student skill vectors with skill vectors associated with one or more roles that correspond to the one or more target pathways.

In some embodiments, modeling engines may be arranged to identify one or more skills included in the role profile skill vectors that may be missing from the student's skill vectors. Accordingly, in one or more of the various embodiments, modeling engines may be arranged to determine one or more actions a student could take to object one or more of the missing skills.

For example, in some embodiments, if a student is missing a skill such as 'advanced math', modeling engines may be arranged to recommend one or more math courses that may satisfy the requirement to provide the missing skills. In some embodiments, modeling engines may be arranged to build a inverted/reverse index the map skills to actions. Accordingly, in some embodiments, such indexes may be employed to determine one or more courses or other actions that may be taken to enable a student to fill in missing skill vector elements.

Next, in one or more of the various embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware-based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method of managing data correlation over a network, using one or more network computers to execute the method by performing actions, comprising:

providing one or more role success models that correspond to one or more roles and to one or more success criteria;

providing one or more student profiles that include one or more of skills or features of one or more student profiles based on their corresponding student information;

employing the one or more role success models to determine one or more intermediate scores based on the one or more student profiles and the one or more success criteria;

generating a predictive score for the one or more students that corresponds with a predicted performance of each student in the one or more roles based on the one or more intermediate scores;

determining one or more actions to recommend to the one or more students to remediate a mismatch of their one or more of skills or features and one or more of role skills or role features that correspond to the one or more roles;

training one or more skill models to determine one or more of alumni skills or alumni features for the plurality of alumni based on alumni information;

machine learning training of one or more role success models to identify one or more alumni that match the one or more success criteria based on the one or more alumni profiles and the one or more success criteria, wherein the one or more role success models are independently trained for different roles;

employing the one or more trained role success models to determine a closeness of a match of a student profile for a student to the one or more success criteria that correspond to the one or more roles based on the one or more skills or features included in the student profile;

generating a display, in a user interface, for an inter-active report that includes the learner score for a student and one or more pathways for the student to increase the student's learner score by completing the one or more recommended actions;

generating telemetry information using one or more interactions by the student with one or more features displayed in the user interface, wherein the telemetry information is used to update the student profile associated with the student;

in response to completion of the one or more recommended actions by the student, automatically updating the one or more skills of the student and generating a new predictive score for the student based on the one or more updated skills and the one or more trained role success models, and wherein one or more new actions are generated and recommended to remediate the mismatch;

generating another display, in the user interface, that includes the one or more new recommended actions to remediate the mismatch for the student that completed the one or more recommended actions; and periodically machine learning retraining the one or more role success models to account for one or more changes to one or more of alumni information, student information, or role description, wherein the machine learning retraining improves effectiveness of determining a closeness of one or more matches of a skill vector or a feature vector to the one or more success criteria.

2. The method of claim 1, wherein employing the one or more skill models further comprises:

determining the one or more of skills or features for the plurality of alumni and the one or more students based on one or more of natural language text included in the alumni information and the student information, or rules, or pattern matching of one or more values in one or more previously determined fields of the alumni information or the student information.

3. The method of claim 1, further comprising:

in response to a student completing performance of the one or more actions, further actions are performed, including:

updating one or more elements of one or more of skill vectors or one or more elements of feature vectors that correspond to the one or more of skills or features of the student; and updating the predictive score based on the one or more role success models and the one or more of updated skill vectors or updated feature vectors.

4. The method of claim 1, further comprising:

generating one or more of alumni skill vectors or alumni feature vectors based on the one or more of alumni skills or alumni features, wherein the one or more alumni profiles include the one or more of alumni skill vectors or feature vectors; and wherein the alumni information includes one or more of educational information or employment information.

5. The method of claim 1, wherein the one or more intermediate scores further comprise:

one or more values that correspond to a strength of a match of the one or more student profiles with the one or more success criteria; and wherein the one or more success criteria is correlated with one or more historically successful performances in the one or more roles.

6. The method of claim 1, wherein the one or more determined alumni features for the plurality of alumni are based one or more of tenure, promotion history, date of hire, number of jobs held, degrees or certificates, or public awards.

7. The method of claim 1, further comprising:

determining a hierarchy of two or more skills from one skill topic or two or more features from one feature topic that is included in the student information, wherein a skill that is determined higher in the hierarchy is a broader skill that includes each skill in the hierarchy that is determined to be lower in the hierarchy; and including the two or more skills or the two or more features in the hierarchy as separate elements in one or more of skill vectors or feature vectors that correspond to the one or more students.

8. A network computer for managing data correlation over a network, comprising:

a memory that stores at least instructions; and one or more processors that execute instructions that enable performance of actions, including:

providing one or more role success models that correspond to one or more roles and to one or more success criteria;

providing one or more student profiles that include one or more of skills or features of one or more student profiles based on their corresponding student information;

employing the one or more role success models to determine one or more intermediate scores based on the one or more student profiles and the one or more success criteria;

generating a predictive score for the one or more students that corresponds with a predicted performance of each student in the one or more roles based on the one or more intermediate scores;

determining one or more actions to recommend to the one or more students to remediate a mismatch of their one or more of skills or features and one or more of role skills or role features that correspond to the one or more roles;

training one or more skill models to determine one or more of alumni skills or alumni features for the plurality of alumni based on alumni information;

machine learning training of one or more role success models to identify one or more alumni that match the one or more success criteria based on the one or more alumni profiles and the one or more success criteria, wherein the one or more role success models are independently trained for different roles;

employing the one or more trained role success models to determine a closeness of a match of a student profile for a student to the one or more success criteria that correspond to the one or more roles based on the one or more skills or features included in the student profile;

generating a display, in a user interface, for an interactive report that includes the learner score for a student and one or more pathways for the student to increase the student's learner score by completing the one or more recommended actions;

generating telemetry information using one or more interactions by the student with one or more features displayed in the user interface, wherein the telemetry information is used to update the student profile associated with the student;

in response to completion of the one or more recommended actions by the student, automatically updating the one or more skills of the student and generating a new predictive score for the student based on the one or more updated skills and the one or more trained role success models, and wherein one or more new actions are generated and recommended to remediate the mismatch;

generating another display, in the user interface, that includes the one or more new recommended actions to remediate the mismatch for the student that completed the one or more recommended actions; and periodically machine learning retraining the one or more role success models to account for one or more changes to one or more of alumni information, student information, or role description, wherein the machine learning retraining improves effectiveness of determining a closeness of one or more matches of a skill vector or a feature vector to the one or more success criteria.

9. The network computer of claim 8, wherein employing the one or more skill models further comprises:
   determining the one or more of skills or features for the plurality of alumni and the one or more students based on one or more of natural language text included in the alumni information and the student information, or rules, or pattern matching of one or more values in one or more previously determined fields of the alumni information or the student information.

10. The network computer of claim 8, further comprising:
    in response to a student completing performance of the one or more actions, further actions are performed, including:
    updating one or more elements of one or more of skill vectors or one or more elements of feature vectors that correspond to the one or more of skills or features of the student; and
    updating the predictive score based on the one or more role success models and the one or more of updated skill vectors or updated feature vectors.

11. The network computer of claim 8, further comprising:
    generating one or more of alumni skill vectors or alumni feature vectors based on the one or more of alumni skills or alumni features, wherein the one or more alumni profiles include the one or more of alumni skill vectors or feature vectors; and
    wherein the alumni information includes one or more of educational information or employment information.

12. The network computer of claim 8, wherein the one or more intermediate scores further comprise:
    one or more values that correspond to a strength of a match of the one or more student profiles with the one or more success criteria; and
    wherein the one or more success criteria is correlated with one or more historically successful performances in the one or more roles.

13. The network computer of claim 8, wherein the one or more determined alumni features for the plurality of alumni are based one or more of tenure, promotion history, date of hire, number of jobs held, degrees or certificates, or public awards.

14. The network computer of claim 8, further comprising:
    determining a hierarchy of two or more skills from one skill topic or two or more features from one feature topic that is included in the student information, wherein a skill that is determined higher in the hierarchy is a broader skill that includes each skill in the hierarchy that is determined to be lower in the hierarchy; and
    including the two or more skills or the two or more features in the hierarchy as separate elements in one or more of skill vectors or feature vectors that correspond to the one or more students.

15. A system for managing data correlation, comprising:
    a network computer, comprising:
    a memory that stores at least instructions; and
    one or more processors that execute instructions that enable performance of actions, including:
        providing one or more role success models that correspond to one or more roles and to one or more success criteria;
        providing one or more student profiles that include one or more of skills or features of one or more student profiles based on their corresponding student information;
        employing the one or more role success models to determine one or more intermediate scores based on the one or more student profiles and the one or more success criteria;
        generating a predictive score for the one or more students that corresponds with a predicted performance of each student in the one or more roles based on the one or more intermediate scores;
        determining one or more actions to recommend to the one or more students to remediate a mismatch of their one or more of skills or features and one or more of role skills or role features that correspond to the one or more roles;
        training one or more skill models to determine one or more of alumni skills or alumni features for the plurality of alumni based on alumni information;

machine learning training of one or more role success models to identify one or more alumni that match the one or more success criteria based on the one or more alumni profiles and the one or more success criteria, wherein the one or more role success models are independently trained for different roles;

employing the one or more trained role success models to determine a closeness of a match of a student profile for a student to the one or more success criteria that correspond to the one or more roles based on the one or more skills or features included in the student profile;

generating a display, in a user interface, for an inter-active report that includes the learner score for a student and one or more pathways for the student to increase the student's learner score by completing the one or more recommended actions;

generating telemetry information using one or more interactions by the student with one or more features displayed in the user interface, wherein the telemetry information is used to update the student profile associated with the student;

in response to completion of the one or more recommended actions by the student, automatically updating the one or more skills of the student and generating a new predictive score for the student based on the one or more updated skills and the one or more trained role success models, and wherein one or more new actions are generated and recommended to remediate the mismatch;

generating another display, in the user interface, that includes the one or more new recommended actions to remediate the mismatch for the student that completed the one or more recommended actions; and periodically machine learning retraining the one or more role success models to account for one or more changes to one or more of alumni information, student information, or role description, wherein the machine learning retraining improves effectiveness of determining a closeness of one or more matches of a skill vector or a feature vector to the one or more success criteria; and a client computer, comprising:
a memory that stores at least instructions; and
one or more processors that execute instructions that enable performance of actions, including:
providing one or more of the student information or the alumni information.

16. The system of claim 15, wherein employing the one or more skill models further comprises:
determining the one or more of skills or features for the plurality of alumni and the one or more students based on one or more of natural language text included in the alumni information and the student information, or rules, or pattern matching of one or more values in one or more previously determined fields of the alumni information or the student information.

17. The system of claim 15, further comprising:
in response to a student completing performance of the one or more actions, further actions are performed, including:
updating one or more elements of one or more of skill vectors or one or more elements of feature vectors that correspond to the one or more of skills or features of the student; and
updating the predictive score based on the one or more role success models and the one or more of updated skill vectors or updated feature vectors.

18. The system of claim 15, further comprising:
generating one or more of alumni skill vectors or alumni feature vectors based on the one or more of alumni skills or alumni features, wherein the one or more alumni profiles include the one or more of alumni skill vectors or feature vectors; and
wherein the alumni information includes one or more of educational information or employment information.

19. The system of claim 15, further comprising:
determining a hierarchy of two or more skills from one skill topic or two or more features from one feature topic that is included in the student information, wherein a skill that is determined higher in the hierarchy is a broader skill that includes each skill in the hierarchy that is determined to be lower in the hierarchy; and
including the two or more skills and the two or more features in the hierarchy as separate elements in one or more of skill vectors or feature vectors that correspond to the one or more students.

20. A processor readable non-transitory storage media that includes instructions for managing data correlation over a network, wherein execution of the instructions by one or more processors enable performance of actions, comprising:
providing one or more role success models that correspond to one or more roles and to one or more success criteria;
providing one or more student profiles that include one or more of skills or features of one or more student profiles based on their corresponding student information;
employing the one or more role success models to determine one or more intermediate scores based on the one or more student profiles and the one or more success criteria;
generating a predictive score for the one or more students that corresponds with a predicted performance of each student in the one or more roles based on the one or more intermediate scores;
determining one or more actions to recommend to the one or more students to remediate a mismatch of their one or more of skills or features and one or more of role skills or role features that correspond to the one or more roles;
employing one or more skill models to determine one or more of alumni skills or alumni features for the plurality of alumni based on alumni information;
machine learning training of one or more role success models to identify one or more alumni that match the one or more success criteria based on the one or more alumni profiles and the one or more success criteria, wherein the one or more role success models are independently trained for different roles;
employing the one or more trained role success models to determine a closeness of a match of a student profile for a student to the one or more success criteria that correspond to the one or more roles based on the one or more skills or features included in the student profile;
generating a display, in a user interface, for an inter-active report that includes the learner score for a student and one or more pathways for the student to increase the student's learner score by completing the one or more recommended actions;

generating telemetry information using one or more interactions by the student with one or more features displayed in the user interface, wherein the telemetry information is used to update the student profile associated with the student;

in response to completion of the one or more recommended actions by the student, automatically updating the one or more skills of the student and generating a new predictive score for the student based on the one or more updated skills and the one or more trained role success models, and wherein one or more new actions are generated and recommended to remediate the mismatch;

generating another display, in the user interface, that includes the one or more new recommended actions to remediate the mismatch for the student that completed the one or more recommended actions; and periodically machine learning retraining the one or more role success models to account for one or more changes to one or more of alumni information, student information, or role description, wherein the machine learning retraining improves effectiveness of determining a closeness of one or more matches of a skill vector or a feature vector to the one or more success criteria.

* * * * *